(12) United States Patent
Tabata et al.

(10) Patent No.: US 7,115,065 B2
(45) Date of Patent: Oct. 3, 2006

(54) VEHICLE CONTROL APPARATUS

(75) Inventors: Atsushi Tabata, Okazaki (JP); Akira Hoshino, Nishikamo-gun (JP); Yoshikazu Tanaka, Toyota (JP); Masami Kondo, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 129 days.

(21) Appl. No.: 10/865,935

(22) Filed: Jun. 14, 2004

(65) Prior Publication Data

US 2004/0259682 A1 Dec. 23, 2004

(30) Foreign Application Priority Data

Jun. 18, 2003 (JP) .............................. 2003-174039

(51) Int. Cl.
*B60K 1/02* (2006.01)

(52) U.S. Cl. .................... 477/3; 477/107; 477/108; 477/109; 477/110; 477/111

(58) Field of Classification Search .................. 477/3, 477/32, 33, 102, 107, 109, 110, 111
See application file for complete search history.

(56) References Cited

U.S. PATENT DOCUMENTS

| | | | | |
|---|---|---|---|---|
| 4,858,496 A | * | 8/1989 | Iwatsuki et al. ............... 477/33 |
| 4,933,851 A | * | 6/1990 | Ito et al. ......................... 701/54 |
| 5,580,331 A | * | 12/1996 | Shiraishi et al. ............. 477/109 |
| 5,899,830 A | * | 5/1999 | Tabata ........................... 477/111 |
| 6,432,025 B1 | * | 8/2002 | Kondo et al. ................. 477/110 |
| 6,855,090 B1 | * | 2/2005 | Tabata et al. ................. 477/107 |
| 2001/0051847 A1 | | 12/2001 | Murakami |
| 2003/0109357 A1 | * | 6/2003 | Tabata ........................... 477/109 |
| 2004/0063540 A1 | * | 4/2004 | Kondo et al. ................. 477/102 |

FOREIGN PATENT DOCUMENTS

JP 9-119328 5/1997
JP 9-310627 12/1997

* cited by examiner

*Primary Examiner*—Charles A. Marmor
*Assistant Examiner*—David D. Le
(74) *Attorney, Agent, or Firm*—Oblon, Spivak, McClelland, Maier & Neustadt, P.C.

(57) ABSTRACT

An apparatus for controlling an automotive vehicle including a target-drive-force setting portion operable to determine a target vehicle drive force, such that the determined target vehicle drive force permits a smooth change of an actual vehicle drive force with a change of the operating amount of the vehicle accelerating member, irrespective of a shifting action of the transmission, a first controlling portion having a relatively high operating response and operable to effect a transient control of a torque of the drive power source, and a second controlling portion having lower operating response than the first controlling portion but is capable of continuously controlling the torque of the drive power source, the second controlling portion being operable to effect a continuous control of the torque of the drive power source following the transient control by the first controlling portion, so that the actual vehicle drive force coincides with said target vehicle drive force after the shifting action of the transmission.

10 Claims, 11 Drawing Sheets

FIG.2

|      | C0 | C1 | C2 | B0 | B1 | B2 | B3 | B4 | F0 | F1 | F2 |
|------|----|----|----|----|----|----|----|----|----|----|----|
| P    | O  |    |    |    |    |    |    |    | O  |    |    |
| Rev  |    |    | O  | O  |    |    |    | O  |    |    |    |
| N    | O  |    |    |    |    |    |    |    | O  |    |    |
| 1st  | O  | O  |    |    |    |    |    | ◎  | O  |    | O  |
| 2nd  | ◎  | O  |    |    |    |    | O  |    | O  |    |    |
| 3rd  | O  | O  |    |    | ◎  | O  |    |    | O  | O  |    |
| 4th  | O  | O  | O  |    |    | △  |    |    | O  |    |    |
| 5th  |    | O  | O  | O  |    | △  |    |    |    |    |    |

O ENGAGED

◎ ENGAGED FOR ENGINE BRAKE APPLICATION

△ ENGAGED (NOT CONTRIBUTING TRANSMISSION OF POWER)

VEHICLE CONTROL APPARATUS

This application is based on Japanese Patent Application No. 2003-174039 filed on Jun. 18, 2003, the contents of which are incorporated hereinto by reference.

BACKGROUND OF THE INVENTION

1. Field of the Invention

The present invention relates in general to a vehicle control apparatus including a drive-power-source-torque control portion for controlling a torque of a drive power source (e.g., engine) for a vehicle, and more particularly to techniques for determining a target vehicle drive torque on the basis of an operating amount of a manually operated vehicle accelerating member and a selected operating position of a transmission having respective different speed ratios, so as to permit a smooth change of the vehicle drive force with a change of the operating amount of the vehicle accelerating member, for thereby improving the drivability of the vehicle, irrespective of a shifting action of the transmission, that is, irrespective of a non-smooth change of the speed ratio of the transmission.

2. Discussion of Related Art

In a vehicle including an automatic transmission having a plurality of operating positions having respective different speed ratios, wherein a selected one of the operating positions is automatically selected, the transmission may suffer from a shock during a shifting action thereof. To reduce the shifting shock of the automatic transmission, a known vehicle is provided with an engine output control apparatus arranged to temporarily control the torque of a drive power source in the form of an engine, so as to smooth a variation in the output torque of the transmission. For example, JP-A-9-119328 discloses a technique wherein a relationship between an operating amount of a manually operated vehicle accelerating member such as an accelerator pedal and an opening angle of an electronically controlled throttle valve is temporarily changed to reduce the engine torque in the process of a shifting action of the transmission, for reducing a change of the output torque of the transmission in the process of the shifting action, to thereby minimize a shifting shock of the transmission.

JP-A-9-310627 discloses an engine output control apparatus for a vehicle, wherein an electronically controlled throttle valve is controlled by an engine control unit according to an output signal of an accelerator sensor, such that the output torque of an engine is reduced upon a shifting action of an automatic transmission, for reducing a shifting shock of the transmission.

Unlike a continuously variable transmission, an automatic transmission having a plurality of operating positions having respective different speed ratios suffers from a considerably large amount of change of its output torque before and after a shifting action thereof, due to a non-smooth abrupt change of the speed ratio from a value before the shifting action to a value after completion of the shifting action. The conventional engine output control apparatus is not satisfactory in its capability to minimize a drawback that the drivability of the vehicle tends to be deteriorated due to a considerably large amount of change of the vehicle drive force upon a shifting action of the automatic transmission.

SUMMARY OF THE INVENTION

The present invention was made in the light of the background art discussed above. It is therefore an object of the present invention to provide an apparatus for controlling a vehicle including an engine and a transmission having a plurality of operating positions having respective speed ratios, which apparatus is arranged to determine a target drive torque of the vehicle on the basis of an operating amount of a manually operated vehicle accelerating member and a selected one of the operating positions of the transmission, so as to permit a smooth change of the vehicle drive force with a change of the operating amount of the vehicle accelerating member, for thereby improving the drivability of the vehicle, irrespective of a shifting action of the transmission.

The above object may be achieved according to the principle of the present invention, which provides an apparatus for controlling an automotive vehicle having a drive power source, a transmission having a plurality of operating positions that are selectively established, and a manually operable vehicle accelerating member, comprising:

- a target-drive-force setting portion operable to determine a target vehicle drive force on the basis of an operating amount of the manually operable vehicle accelerating member and a presently selected one of the plurality of operating positions of the transmission, such that the determined target vehicle drive force permits a smooth change of an actual vehicle drive force with a change of the operating amount of the vehicle accelerating member, irrespective of a shifting action of the transmission;
- a first controlling portion having a relatively high operating response and operable to effect a transient control of a torque of the drive power source so that the actual vehicle drive force coincides with the target vehicle drive force after the shifting action of the transmission; and
- a second controlling portion having lower operating response than the first controlling portion but is capable of continuously controlling the torque of the drive power source, said second controlling portion being operable to effect a continuous control of the torque of the drive power source following the transient control by the first controlling portion, so that the actual vehicle drive force coincides with the target vehicle drive force after the shifting action of the transmission.

In the vehicle control apparatus of the present invention constructed as described above, the target-drive-force setting portion determines the target vehicle drive force on the basis of the operating amount of the manually operable vehicle accelerating member (e.g., an accelerator pedal) and the presently selected position of the transmission, such that the determined target vehicle drive force permits a smooth change of the actual vehicle drive force with an increase of the operating amount of the vehicle accelerating member, irrespective of the shifting action of the transmission. Further, the first controlling portion having a relatively high operating response effects a temporary or transient control of the torque of the drive power source (drive-power-source torque), and the second controlling portion capable of continuously controlling the drive-power-source torque effects the continuous control of the drive-power-source torque following the transient control by the first controlling portion. In this arrangement, the output torque of the transmission is smoothly changed with a change of the operating amount of the manually operable vehicle accelerating member, without an abrupt change of the output torque upon a shifting action of the transmission, so that an abrupt change of the vehicle drive force after the shifting action is prevented to improve the drivability of the vehicle. The first and second controlling portions include drive-power-source-torque control devices that are available on the vehicle and need not be provided as control devices exclusively designed for the purpose of controlling the drive-power-source torque, so as to permit a smooth change of the vehicle drive force upon a shifting action of the transmission.

Where the drive power source device includes at least one of an engine and an electric motor, the first controlling portion preferably includes at least one of an ignition-timing control device operable to effect an ignition-timing control of adjusting an ignition timing of the engine, and an electric-motor-torque control device operable to effect an electric-motor-torque control of controlling a torque of the electric motor. Accordingly, the drive-power-source torque can be controlled with an excellent response characteristic.

The second controlling portion preferably includes at least one of an electronic-throttle-valve control device operable to effect an electronic-throttle-valve control of controlling an opening angle of an electronically controlled throttle valve of the engine, a supercharging-pressure control device operable to effect a supercharging-pressure control of controlling a supercharging pressure of a supercharger of the engine, and a valve-device control device operable to effect an engine-cylinder control of controlling the number of operable cylinders of the engine. These devices are capable of continuously controlling the drive-power-source torque for a relatively long time.

In one preferred form of the invention, the vehicle control apparatus further comprises a shifting-completion determining portion operable to determine whether the shifting action of the transmission is completed, and a transient-control-time-lapse determining portion operable to determine whether a predetermined transient control time has passed after a moment of determination by the shifting-completion determining portion that the shifting action is completed. In this case, the transient control of the torque of the drive power source by the first controlling portion is effected for the predetermined transient time, and is switched to the continuous control by the second controlling portion at a moment of determination by the transient-control-time-lapse determining portion that the predetermined transient control time has passed.

In one advantageous arrangement of the above-described preferred form of the invention, the shifting action of the transmission is shift-down, and the transient control of the torque of the drive power source by the first controlling portion is gradually switched to the continuous control by the second controlling portion such that an amount of change of the torque of the drive power source by the first controlling portion in a direction that permits the smooth change of the actual vehicle drive force is gradually increased while an amount of change of the torque of the drive power source by the second controlling portion in the above-indicated direction is gradually reduced.

In another preferred form of the invention, the vehicle control apparatus further comprises a memory storing a data map representative of a predetermined relationship among the target vehicle drive force, the operating amount of the manually operable vehicle accelerating member and the plurality of operating positions of the transmission, and wherein the target-drive-force setting portion determines the target vehicle drive force on the basis of the operating amount of the manually operable vehicle accelerating member and the presently selected position of the transmission, and according to the predetermined relationship represented by the data map stored in the memory.

BRIEF DESCRIPTION OF THE DRAWINGS

The above and other objects, features, advantages and technical and industrial significance of the present invention will be better understood by reading the following detailed description of a preferred embodiment of the invention, when considered in connection with the accompanying drawings, in which:

FIG. 2 is a table indicating a relationship between combinations of operating states of hydraulically operated frictional coupling devices of an automatic transmission of the vehicle drive system shown in FIG. 1, and operating positions of the automatic transmission to be established by the respective combinations of the operating states;

DETAILED DESCRIPTION OF THE PREFERRED EMBODIMENTS

Figure 1:
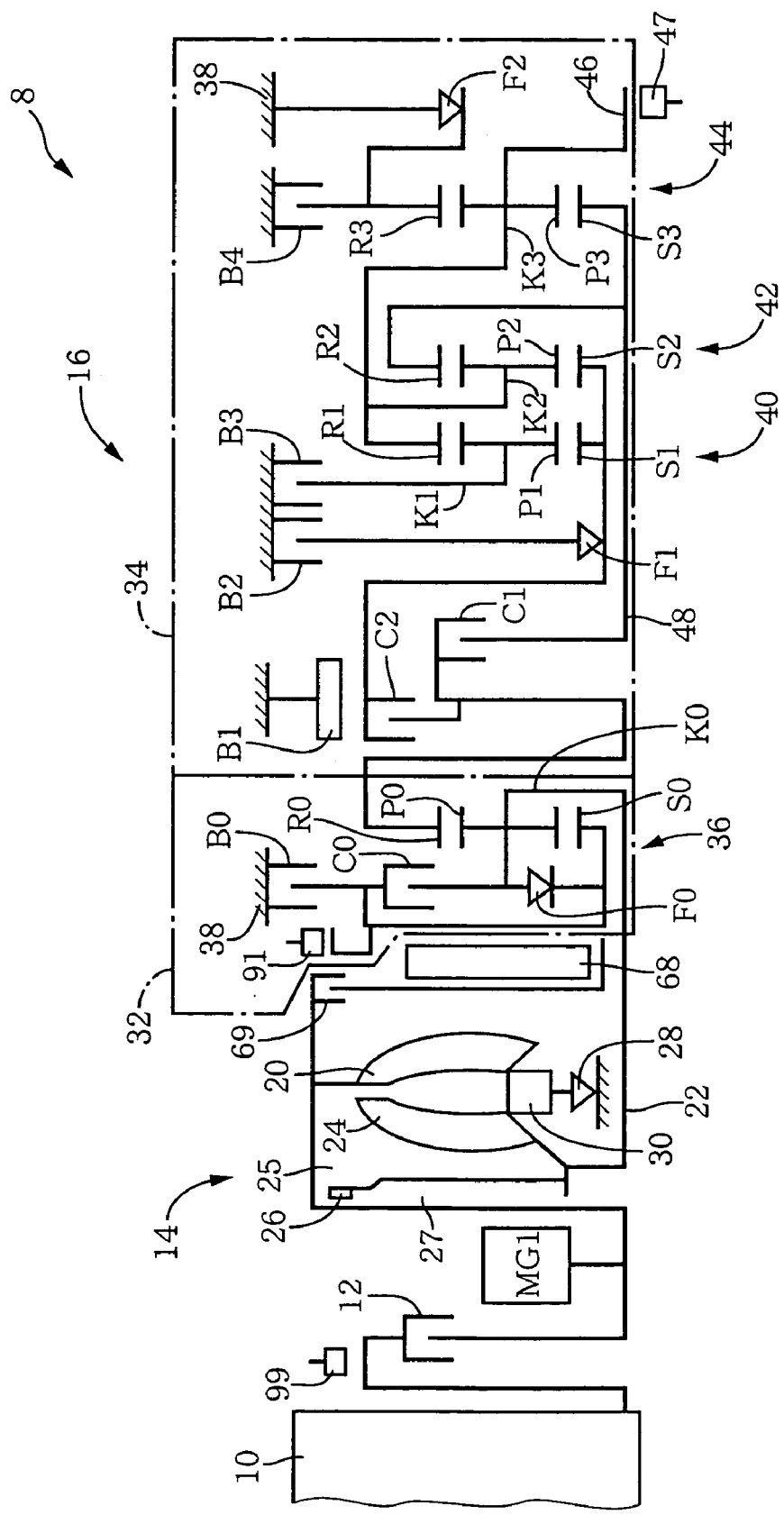
FIG. 1 is a schematic view showing a part of a drive system of a hybrid vehicle, which is controlled by a control apparatus constructed according to one embodiment of this invention.

Referring first to the schematic view of FIG. 1, there is shown an arrangement of a drive system 8 of a hybrid vehicle that is controlled by a vehicle control apparatus constructed according to one embodiment of this invention. The vehicle drive system 8 includes an internal combustion engine 10, an input clutch 12, a fluid-operated power transmitting device in the form of a torque converter 14, and an automatic transmission 16. The engine 10 constitute a part of a drive power source of the vehicle. An output of the engine 10 is transmitted to the automatic transmission 16 through the input clutch 12 and torque converter 14, and is transmitted from the automatic transmission 16 to drive wheels through a differential gear device and drive axles, which are well known in the art and are not shown. Between the input clutch 12 and the torque converter 14, there is disposed the above-described first motor/generator MG1, which functions as an electric motor and an electric generator.

The torque converter 14 includes: a pump impeller 20 connected to the input clutch 12; a turbine impeller 24 connected to an input shaft 22 of the automatic transmission 16; a lock-up clutch 26 for directly connecting the pump and turbine impellers 20, 24; a one-way clutch 28; and a stator impeller 30 which is prevented by the one-way clutch 28 from rotating in one of opposite directions.

The lock-up clutch 26 is a hydraulically operated friction clutch which has an engaging chamber 25 and a releasing chamber 27 and which is engaged in the presence of a difference $\Delta P$ between two fluid pressures in the respective engaging and releasing chambers 25, 37. When the lock-up clutch 26 is placed in its fully engaged state, the pump and turbine impellers 20, 24 are rotated as a unit. When the lock-up clutch 26 is in a partially slipping state with the pressure difference $\Delta P$ being feed-back controlled to adjust its engaging torque, the turbine impeller 24 is rotated by the pump impeller 20 such that the rotating speed of the turbine impeller 24 is lower than that of the pump impeller 20 by a predetermined target slip speed (for example, 50 r.p.m.), when the vehicle is driven by an output of the engine 10, for example. When the vehicle is driven by a kinetic energy of the vehicle in a running state with the engine 10 kept in an off state, for example, the pump impeller 20 is rotated by the turbine impeller 24 such that the rotating speed of the pump impeller 20 is lower than that of the turbine impeller 24 by the predetermined target slip speed (e.g., 50 r.p.m.).

The automatic transmission 16 has a plurality of operating positions having respective speed ratios and is placed in a selected one of the operating positions, as described below. The automatic transmission 16 includes a first transmission unit 32 having two speed positions, that is, a high-speed position and a low-speed position, and a second transmission unit 34 having six operating positions, that is, one reverse drive position and five forward drive positions. The first transmission unit 32 includes a high-low switching planetary gear device 36 having a sun gear S0, a ring gear R0, a carrier K0, and planetary gears P0 which are rotatably supported by the carrier K0 and which mesh with the sun gear S0 and ring gear R0. The first transmission unit 32 further includes a clutch C0 and a one-way clutch F0 disposed between the sun gear S0 and the carrier K0, and a brake B0 disposed between the sun gear S0 and a housing 38.

The second transmission unit 34 includes a first planetary gear set 40, a second planetary gear set 42, and a third planetary gear set 44. The first planetary gear set 40 includes a sun gear S1, a ring gear R1, a carrier K1, and planetary gears P1 which are rotatably supported by the carrier K1 and which mesh with the sun gear S1 and ring gear R1. The second planetary gear set 42 includes a sun gear S2, a ring gear R2, a carrier K2, and planetary gears P2 which are rotatably supported by the carrier K2 and which mesh with the sun gear S2 and ring gear R2. The third planetary gear set 44 includes a sung gear S3, a ring gear R3, a carrier K3, and planetary gears P3 which are rotatably supported by the carrier K3 and which mesh with the sun gear S3 and ring gear R3.

The sun gears S1 and S2 are integrally connected to each other, while the ring gear R1 and carriers K1 and K2 are integrally connected to each other. The carrier K3 is connected to an output shaft 46 of the automatic transmission 16. A clutch C1 is disposed between the ring gear R0 and an intermediate shaft 48 connected to the sun gear S3, while a clutch C2 is disposed between the sun gears S1 and S2 and the ring gear R0. A brake B1 of band type for inhibiting rotation of the sun gears S1 and S2 is fixed to the housing 38. A one-way clutch F1 and a brake B2 are disposed in series with each other between the sun gears S1 and S2 and the housing 38. This one-way clutch F1 is engaged when the sun gears S1 and S2 receive a torque so as to be rotated in a direction opposite to the direction of rotation of the input shaft 22.

A brake B3 is disposed between the carrier K1 and the housing 38, while a brake B4 and a one-way clutch F2 are disposed in parallel with each other between the ring gear R3 and the housing 38. This one-way clutch F2 is engaged when the ring gear R3 receives a torque so as to be rotated in the direction opposite to the direction of rotation of the input shaft 22.

The automatic transmission 16 constructed as described above has one reverse drive position and five forward drive positions, which are selectively established by engagement of respective combinations of frictional coupling devices in the form of the clutches C0–C2, brakes B0–B4 and one-way clutches F0–F2, as indicated in the table of FIG. 2 by way of example. In FIG. 2, "○" indicates the engaged state of each frictional coupling device, and the absence of any symbol indicates the released state of each frictional coupling device. "⊚" indicates the engagement of the appropriate frictional coupling device for applying an engine brake to the vehicle, and "Δ" indicates the engagement of the appropriate frictional coupling device, which does not contribute to transmission of power. It will be understood from the table of FIG. 2 that a 2–3 shift-up action of the automatic transmission 16 from a $2^{nd}$-speed position to a $3^{rd}$-speed position is a so-called "clutch-to-clutch" shifting action which is effected by an engaging action of the brake B2 and a releasing action of the brake B3 which take place concurrently with each other. A 3–2 shift-down action of the automatic transmission 16 from the $3^{rd}$-speed position to the $2^{nd}$-speed position is also a "clutch-to-clutch" shifting action which is effected by an engaging action of the brake B3 and a releasing action of the brake B2 which take place concurrently with each other.

Figure 3:
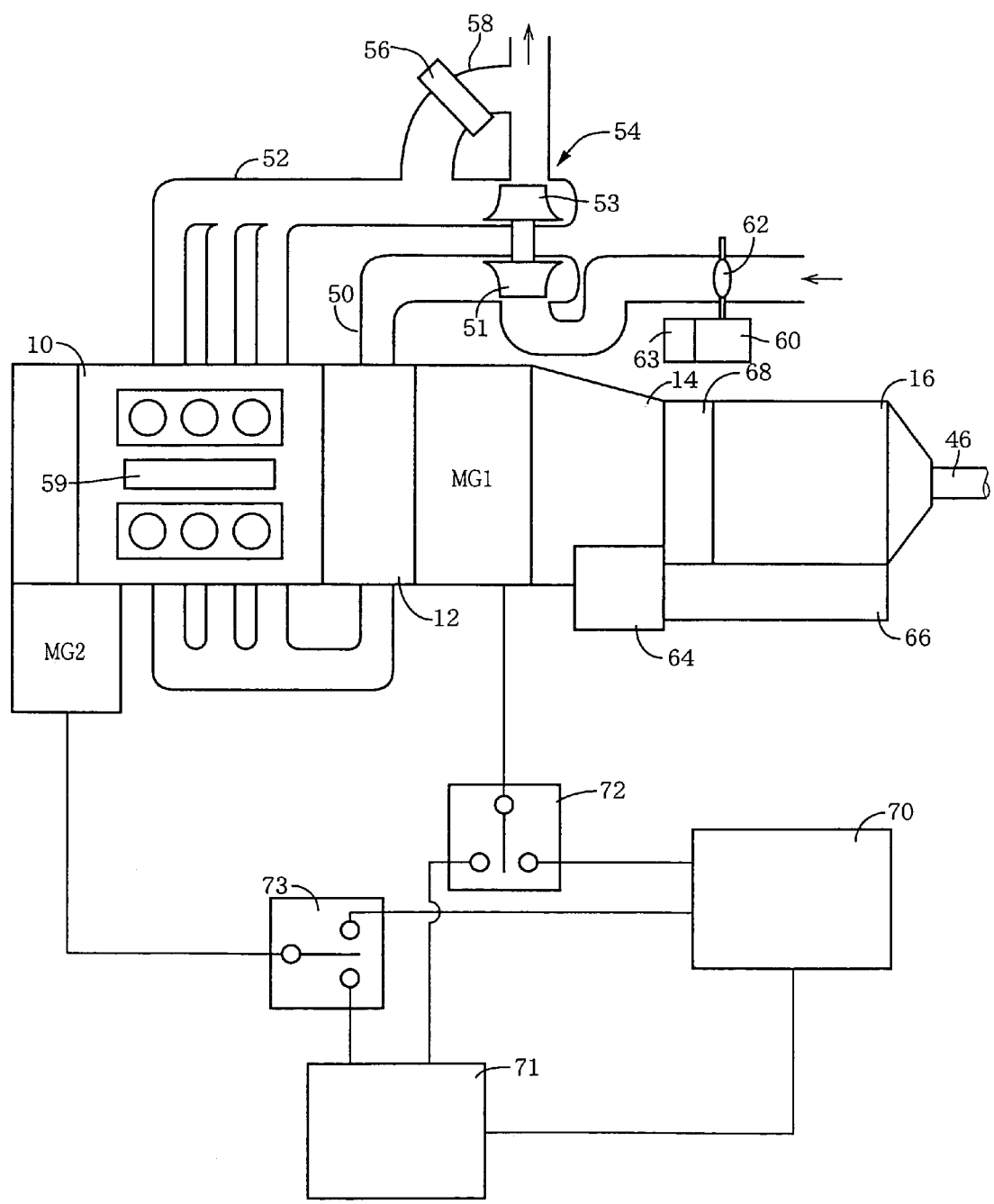
FIG. 3 is a schematic view showing various devices of the vehicle drive system of FIG. 1 including the engine and automatic transmission.

The engine 10 is provided with a supercharger 54 of exhaust turbocharger type having a pump impeller 51 disposed in an intake pipe 50, and a turbine impeller 53 disposed in an exhaust pipe 52, as shown in FIG. 3. The turbine impeller 53 is rotated by a stream of an exhaust gas or emission from the engine 10 through the exhaust pipe 52, and the pump impeller 51 is connected to the turbine impeller 53 and is rotated by the turbine impeller 53 to compress an intake air to be introduced into the engine 10. A by-pass passage 58 which by-passes the turbine impeller 53 is connected to the exhaust pipe 52 such that the by-pass-passage 58 is disposed in parallel with a portion of the exhaust pipe 52 in which the turbine impeller 53 is provided. The by-pass passage 58 is provided with an exhaust waste gate valve 56 which is controlled to change a ratio of a volume of the exhaust emission flowing to drive the turbine impeller 53, to a volume of the exhaust emission flowing through the by-pass passage 58, for thereby adjusting a supercharging pressure Pa within the intake pipe 50.

The supercharger 54 of exhaust turbocharger type may be replaced or assisted by a supercharger of mechanical type driven by the engine 10 or an electric motor. An electronically controlled throttle valve 62 is also disposed within the intake pipe 50 of the engine 10. The throttle valve 62 is operated by a throttle actuator 60 such that an angle of opening $\theta_{TH}$ of the throttle valve 62 is in principle controlled to a value corresponding to an operating amount Acc of a manually operated vehicle accelerating member in the form of an accelerator pedal 88 (FIG. 11), which operating amount Acc represents an output of the vehicle drive system 8 as required by an operator of the vehicle.

Figure 4:
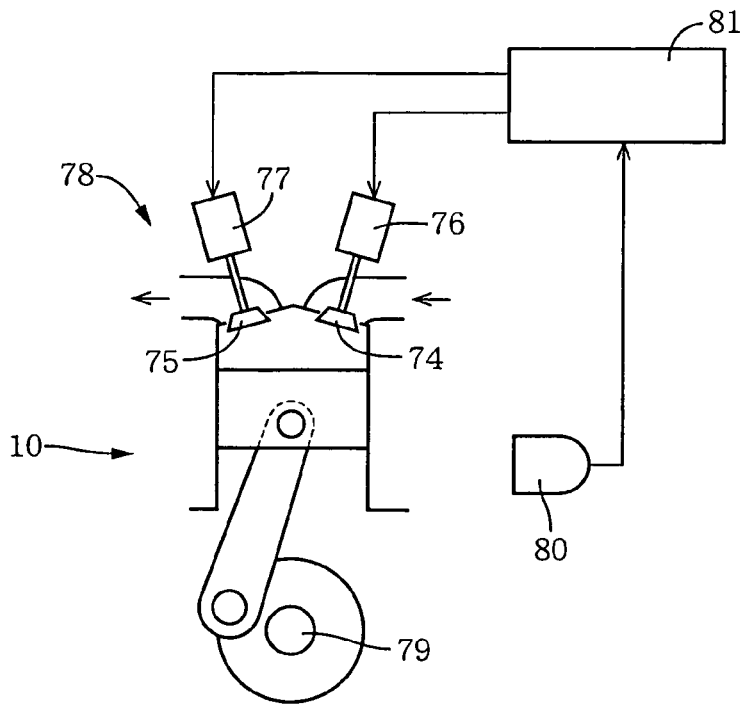
FIG. 4 is a view illustrating a variable valve mechanism provided for each cylinder of the engine.

As shown in FIG. 4, the engine 10 is provided with a variable valve mechanism 78 and a valve drive control device 81. The variable valve mechanism 78 includes an electric actuator in the form of an electromagnetic actuator 76 for opening and closing the intake valve 74 of each cylinder of the engine 10, and an electric actuator in the form of an electromagnetic actuator 77 for opening and closing the exhaust valve 75 of each cylinder. The valve drive control device 81 is arranged to control the timings and periods of opening and closing actions and lift amounts of the intake and exhaust valves 74, 75, according to an output signal of an angular position sensor 80 for detecting an angular position of a crankshaft 79 of the engine 10. The valve drive control device 81 not only optimizes the opening and closing timings of the intake and exhaust valves 74, 75 depending upon a load acting on the engine 10, but also adjusts the opening and closing timings to be adapted to one of a 4-cycle operating mode and a 2-cycle operating mode which is selected according to a mode selecting signal. The engine 10 has a function of controlling its speed $N_E$, with the valve drive control device 81 which permits the adjustment of the operating timings of the intake and exhaust valves 74, 75 of the variable valve mechanism 78 and the selection of the number of the operating cylinders. For example, the opening and closing actions of the exhaust valve 74 are controlled with the intake valve 74 kept closed, so that a rotary motion of the engine 10 is consumed by a resistance to the rotary motion, which is generated in the compression stroke of the piston, whereby the operating speed $N_E$ of the engine 10 can be positively or rapidly reduced. Further the opening angle of the intake valve 74 is controlled to adjust a rate of change of the engine speed $N_E$.

Figure 5:
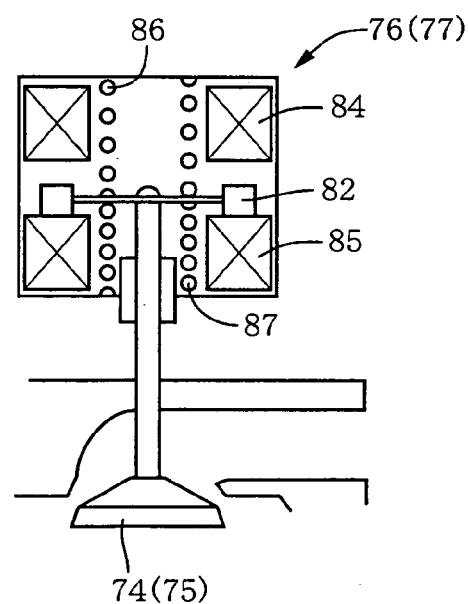
FIG. 5 is a view illustrating an arrangement of an electromagnetic actuator system provided in the variable valve mechanism of FIG. 4, for opening and closing an intake valve or an exhaust valve at a predetermined timing.

As shown in FIG. 5, each of the electromagnetic actuators 76, 77 includes a circular disc-like movable member 82 made of a magnetic material, which is connected to the intake or exhaust valve 74, 75 such that the movable member is movable in the axial direction of the valve 74, 75. The electromagnetic actuator 76, 77 further includes a pair of electromagnets 84, 85 disposed on the respective opposite sides of the movable member 82, and a pair of springs 86, 87 biasing the movable member 82 to its neutral position between the two electromagnets 84, 85. The movable member 82 is attracted by one of the two electromagnets 84, 85. The intake valve 74 and exhaust valve 75 are electrically operated shut-off valves whose opening and closing actions are electrically controllable.

As also shown in FIG. 3, the first motor/generator MG1 described above is disposed between the engine 10 and the automatic transmission 16, such that the clutch 12 is disposed between the engine 10 and the first motor/generator MG1. The vehicle drive system 8 further includes a hydraulic control unit 66 which receives a pressurized fluid (line pressure) from a mechanical oil pump 68 and which controls the hydraulically operated frictional coupling devices of the automatic transmission 16 and the lock-up clutch 26. The mechanical oil pump 68 is mechanically connected to and directly driven by the engine 10 through an electrically operated hydraulic pump or an oil pump clutch 69 (shown in FIG. 1). The pressure of the pressurized fluid received by the hydraulic control unit 66 is high enough to place the hydraulically operated frictional coupling devices in their fully engaged states.

A second motor/generator MG2 is operatively connected to the engine 10, as indicated in FIG. 3. The second motor/generator MG functions as an electric drive motor and an electric generator. The first motor/generator MG1 and the second motor/generator MG2 function as an assisting drive device which assists the engine 10 to drive the vehicle, and cooperate with the engine 10 to constitute the drive power source for the vehicle. The vehicle drive system 8 further includes a fuel cell 70 and a secondary battery 71 which serve as an electric power source for the first motor/generator MG1 and the second motor/generator MG2, and also includes two switching devices 72, 73 which are arranged to control the amounts of electric current to be applied from the fuel cell 70 and the secondary battery 71 to the motor/generator MG1 and motor/generator MG2 when serving as the electric motors, and the amounts of electric current with which the secondary battery 71 is charged by the motor/generator MG1 and motor/generator MG2 when serving as the electric generators. Each of the switching devices 72, 73 is a device capable of performing a switching function, for instance, a semiconductor switching element capable of serving as an inverter.

Figure 6:
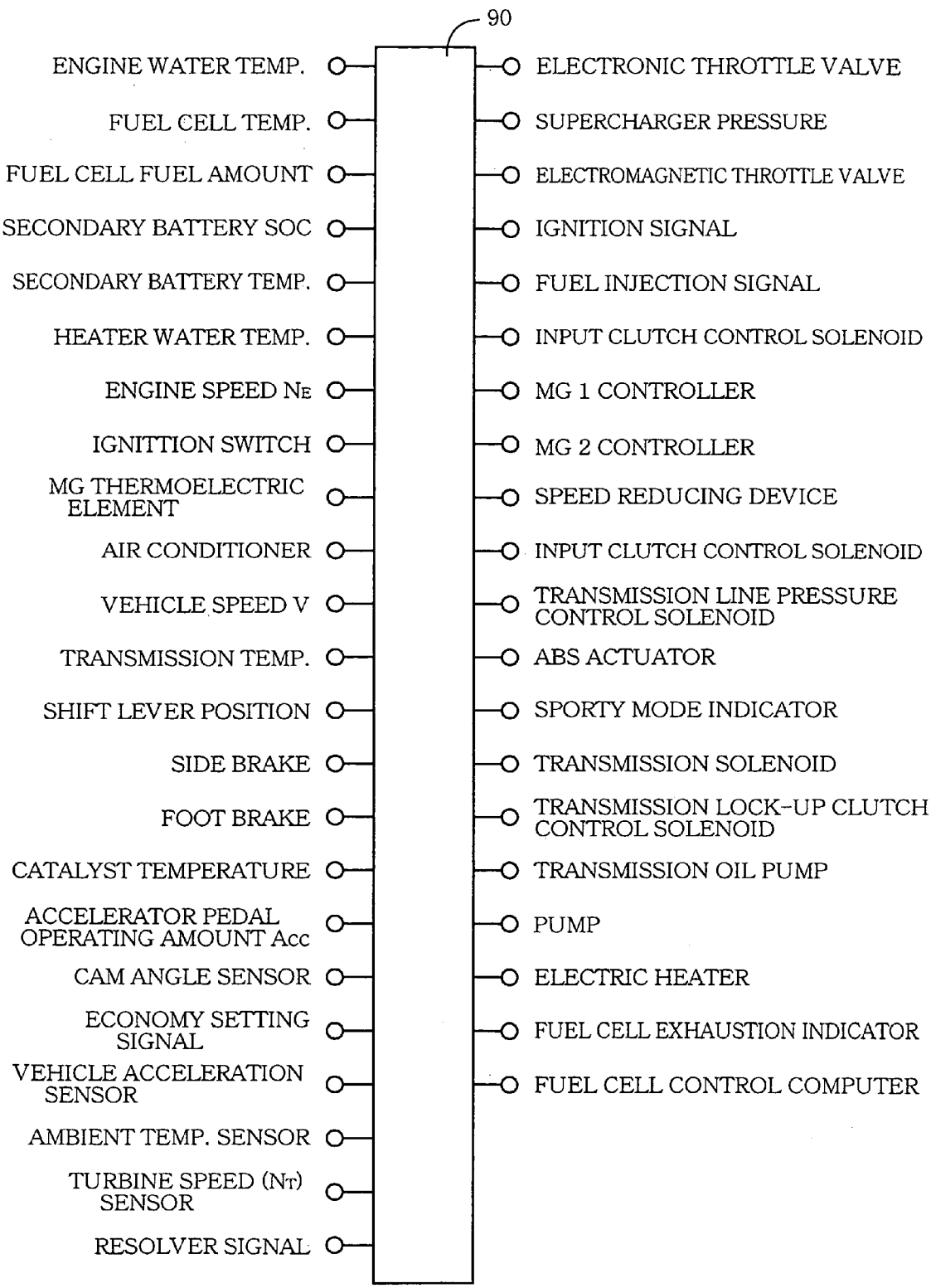
FIG. 6 is a view for explaining input and output signals of an electronic control device of the vehicle control apparatus for the vehicle drive system of FIG. 1.

The vehicle drive system 8 described above is controlled by the above-indicated electronic control unit (ECU) 90, the input and output signals of which are indicated in FIG. 6. The electronic control unit 90 receives as its input signals the following output signals of various sensors (not shown): an accelerator signal indicative of the operating amount Acc of the accelerator pedal 88 detected by an accelerator sensor 89 (FIG. 11); a throttle opening angle signal indicative of the opening angle $\theta_{TH}$ of the throttle valve 62 detected by a throttle opening sensor 63 (FIG. 3); a vehicle speed signal indicative of a rotating speed $N_{OUT}$ of the output shaft 46 of the automatic transmission 16 which is detected by an output-shaft-speed sensor 47 (FIG. 1) and which can be used to detect a running speed V of the vehicle; a turbine speed signal indicative of a rotating speed $N_T$ of the turbine impeller 24 (rotating speed $N_{IN}$ of the input shaft 22) detected by a turbine-speed sensor (not shown); an engine speed signal indicative of the operating speed $N_E$ of the engine 10 detected by an engine-speed sensor 99 (FIG. 1); a signal indicative of the supercharging pressure Pa in the intake pipe 50; a signal indicative of an air/fuel ratio A/F of an air-fuel mixture supplied to the engine 10; a signal indicative of a presently selected operating position $P_{SH}$ of a shift lever 92 (FIG. 11) detected by a shift-position detector 98 (FIG. 10); and a signal indicative of a temperature $T_{OIL}$ of working fluid used for the automatic transmission 16.

The electronic control unit 90 generates the following output signals: a throttle actuator drive signal for controlling the throttle actuator 60 to operate the throttle valve 62, for establishing the throttle opening angle $\theta_{TH}$ corresponding to the operating amount Acc of the accelerator pedal 88; a fuel injection signal for controlling an amount of fuel to be injected from a fuel injector valve (not shown) into each cylinder of the engine 10; solenoid drive signals S1, S2 and S3 for controlling solenoid coils for driving shift control valves incorporated in the hydraulic control unit 66, to shift the automatic transmission 16 as needed; a drive signal $D_{SLT}$ for controlling a linear solenoid valve SLT to control the line pressure for controlling the clutch-to-clutch shifting actions of the automatic transmission 16; a drive signal $D_{SLU}$ for controlling a linear solenoid valve SLU to control engaging, releasing and slipping actions of the lock-up clutch 26; a drive signal $D_{SLN}$ for controlling a linear solenoid valve SLN to control a back pressure of an accumulator.

The electronic control unit 90 includes a so-called microcomputer incorporating a central processing unit (CPU), a read-only memory (ROM), a random-access memory (RAM), and an input-output interface. The CPU operates to effect signal processing operations according to control programs stored in the ROM, while utilizing a temporary data storage function of the RAM, for executing various control routines such as: a throttle valve control routine for controlling the opening angle $\theta_{TH}$ (%) of the throttle valve 56; a transmission shift control routine for controlling the shifting actions of the automatic transmission 26; a lock-up clutch control routine for controlling the engaging, releasing and slipping actions of the lock-up clutch 26; a supercharging pressure control routine for controlling the supercharging pressure Pa within the intake pipe 50; an air/fuel ratio control routine for controlling the air/fuel ratio A/F of the engine 10: a cylinder-number selecting control routine for changing the number of the operating cylinders of the engine 10; and a mode selecting control routine for selecting one of the 2-cycle and 4-cycle operating modes.

Figure 7:
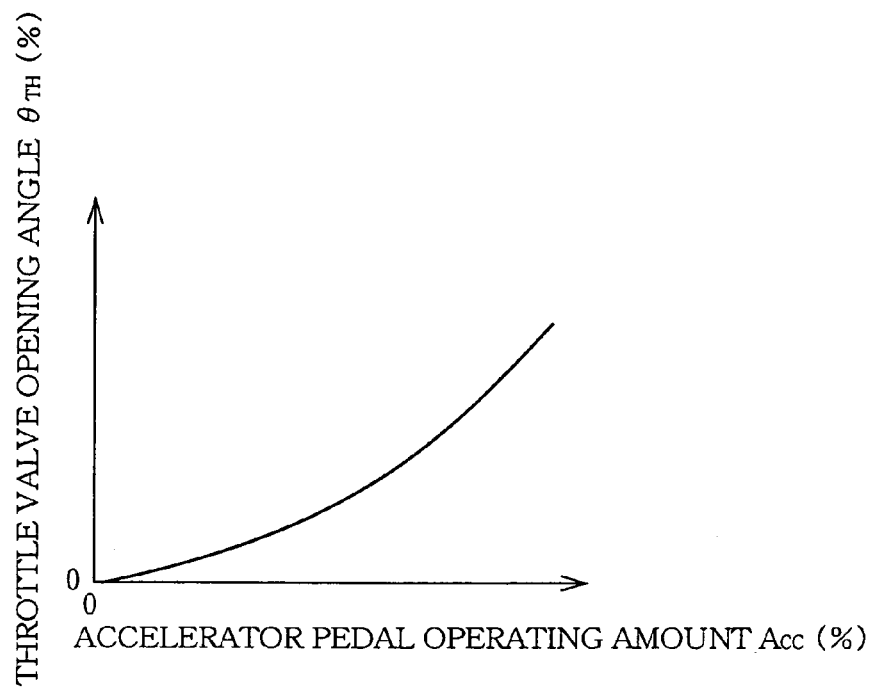
FIG. 7 is a view indicating a relationship between an opening angle of a throttle valve of the engine and an operating amount of an accelerator pedal, in the vehicle drive system controlled by the vehicle control apparatus

For instance, the output of the engine 10 is controlled by controlling the throttle actuator 50 to control the opening and closing actions of the throttle valve 62, controlling the fuel injector valve to control the amount of the fuel to be injected into the engine 10, and controlling an ignition device 59 (FIG. 33) such as an igniter. The opening angle $\theta_{TH}$ of the throttle valve 62 is controlled by driving the throttle actuator 60 on the basis of the detected operating amount Acc (%) of the manually operated vehicle accelerating member in the form of the accelerator pedal 88, and according to a predetermined relationship between the opening angle $\theta_{TH}$ and operating amount Acc, as indicated in the graph of FIG. 7, by way of example, such that the opening angle $\theta_{TH}$ of the throttle valve 62 increases with an increase in the operating amount Acc of the accelerator pedal 88.

Figure 8:
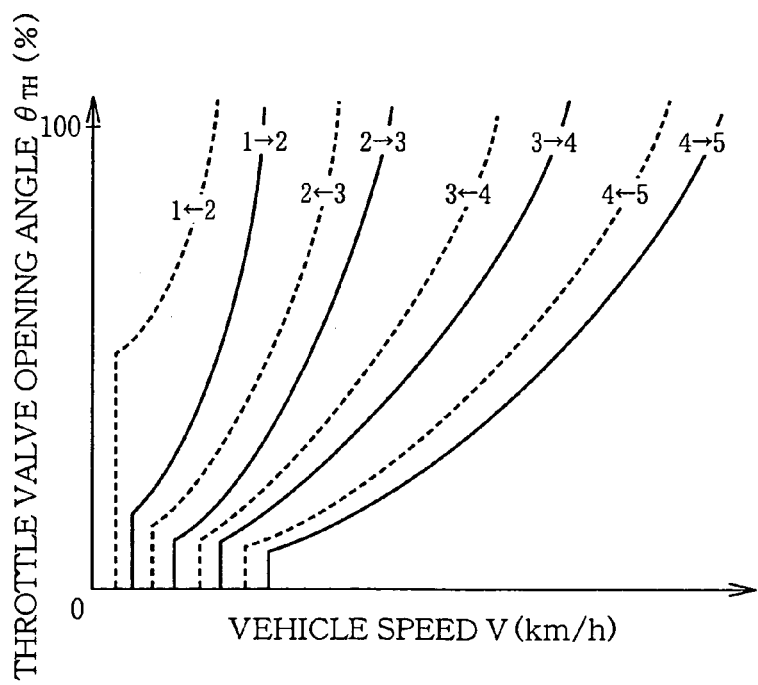
FIG. 8 is a view indicating boundary lines used by the electronic control unit to control shifting actions of the automatic transmission of the vehicle drive system.
Figure 9:
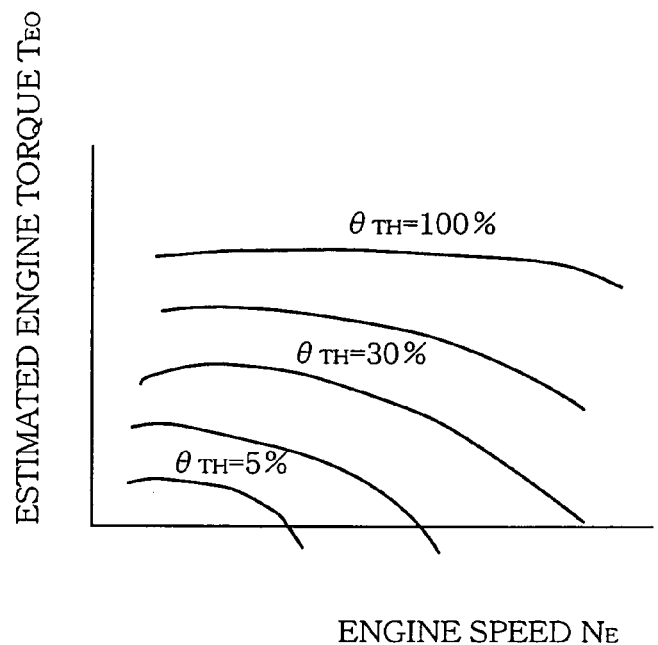
FIG. 9 is a view indicating a stored data map used by the electronic control unit to calculate an estimated value of the engine torque on the basis of the opening angle of the throttle valve and an operating speed of the engine.

The transmission shift control routine is formulated to effect a determination as to whether the automatic transmission 16 should be shifted down or up, on the basis of the detected operating amount Acc (%) of the accelerator pedal 88 or opening angle $\theta_{TH}$ of the throttle valve 62 and the detected vehicle running speed V (km/h), and according to predetermined shift-down and shift-up boundary lines represented by a data map stored in the ROM, as shown in FIG. 8. When any shift-up or shift-down action of the automatic transmission 16 is determined to be required, the solenoid coils of the shift control valves in the hydraulic control circuit 66 are controlled to effect the required shift-up or shift-down action. Namely, the determination is made as to whether a point defined by the detected operating amount Acc or throttle opening angle $\theta_{TH}$ and the detected vehicle running speed V has moved across f the throttle valve 62 has moved across any one of the shift-up and shift-down boundary lines. In the transmission shift control, an input torque $T_{IN}$ of the automatic transmission 16 is estimated, and the hydraulic engaging pressure of the hydraulically operated frictional coupling device which is engaged to effect the shifting action, or the line pressure for this hydraulic engaging pressure is adjusted to a value corresponding to the estimated input torque $T_{IN}$. Further, a torque $T_E$ of the engine 10 which is transmitted to the automatic transmission 16 through the lock-up clutch 26 and which gives the input torque $T_{IN}$ is calculated as an estimated engine torque $T_{EO}$ on the basis of the detected engine speed $N_E$ and the required output of the drive power source as represented by the detected opening angle $\theta_{TH}$ of the throttle valve 62, for example, and according to a predetermined relationship among the detected engine speed $N_E$ and throttle opening angle $\theta_{TH}$ and the estimated engine torque $T_{EO}$, as indicated in FIG. 9 by way of example. This predetermined relationship is also represented by a data map stored in the ROM.

Figure 10:
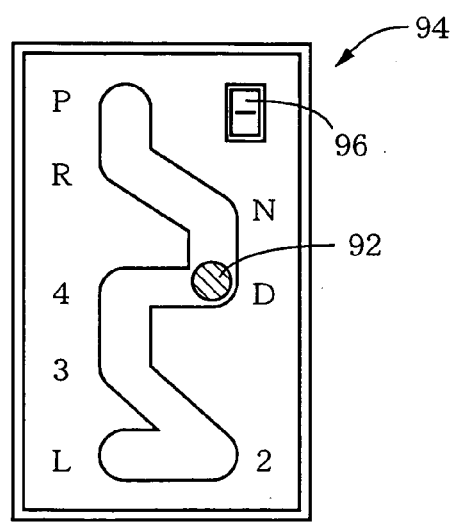
FIG. 10 is a view showing a shifting device provided for shifting the automatic transmission.

As shown in FIG. 10, a manually operated shift-position selecting device in the form of a shifting device 94 includes the shift lever 92 indicated above and is located near an operator's seat provided in the vehicle. The shift lever 92 has the following operating positions: a parking position P for locking the output shaft 46 of the automatic transmission 16; a reverse drive position R for reverse running of the vehicle; a neutral position N in which a power transmitting path through the automatic transmission 16 is disconnected; a forward drive position D (highest-speed position) in which the automatic transmission 16 is shiftable to a selected one of $1^{st}$-speed, $2^{nd}$-speed, $3^{rd}$-speed, $4^{th}$-speed and $5^{th}$-speed positions in an automatic shifting mode; a fourth engine-braking drive position 4 in which the automatic transmission 16 is shiftable to a selected one of the $1^{st}$-speed through $4^{th}$-speed positions in the automatic shifting mode and an engine brake is applied to the vehicle in the selected speed position; a third engine-braking drive position 3 in which the automatic transmission 16 is shiftable to a selected one of the $1^{st}$-speed through $3^{rd}$-speed positions in the automatic shifting mode and the engine brake is applied to the vehicle in the selected speed position; a second engine-braking drive position 2 in which the automatic transmission 16 is shiftable to a selected one of the $1^{st}$-speed and $2^{nd}$-speed positions in the automatic shifting mode and the engine brake is applied to the vehicle in the selected $1^{st}$-speed or $2^{nd}$-speed position; and a first engine-braking drive position L in which the automatic transmission 16 is placed in the $1^{st}$-speed position and the engine brake is applied to the vehicle with the transmission 16 placed in the $1^{st}$-speed position.

The parking position P and the neutral position N are non-drive positions in which the vehicle is not driven, and the reverse drive position R is a reverse running position for driving the vehicle in the reverse direction, while the forward drive position D and the fourth, third, second and first engine-braking drive positions 4, 3, 2, L are all forward running positions for driving the vehicle in the forward direction. The forward drive position D is a highest-speed running position or non-engine-braking running position in which the vehicle can be driven at a highest speed, and the engine-braking drive positions 4, 3, 2 and L are selected to drive the vehicle with larger drive forces, and are engine-braking positions in which the engine braking is applied to the vehicle while the vehicle is driven with a kinetic energy. To place the automatic transmission 16 in the $2^{nd}$-speed position indicated in FIG. 2 while the shift lever 94 is placed in the non-engine-braking forward drive position D, the clutch C1 and the brake B3 are engaged. While the shift lever 94 is placed in the second engine-braking position 2, on the other hand, the clutch C0 as well as the clutch C1 and brake B3 is engaged to place the automatic transmission 16 in the $2^{nd}$-speed position.

As shown in FIG. 10, the shifting device 94 further includes a mode selector switch 96 used to select a SPORTY mode for sporty running of the vehicle, and a MANUAL SHIFT mode in which the automatic transmission 16 can be manually shifted by using manual shift-down and shift-up pushbuttons (not shown) provided on a steering wheel of the vehicle.

Figure 11:
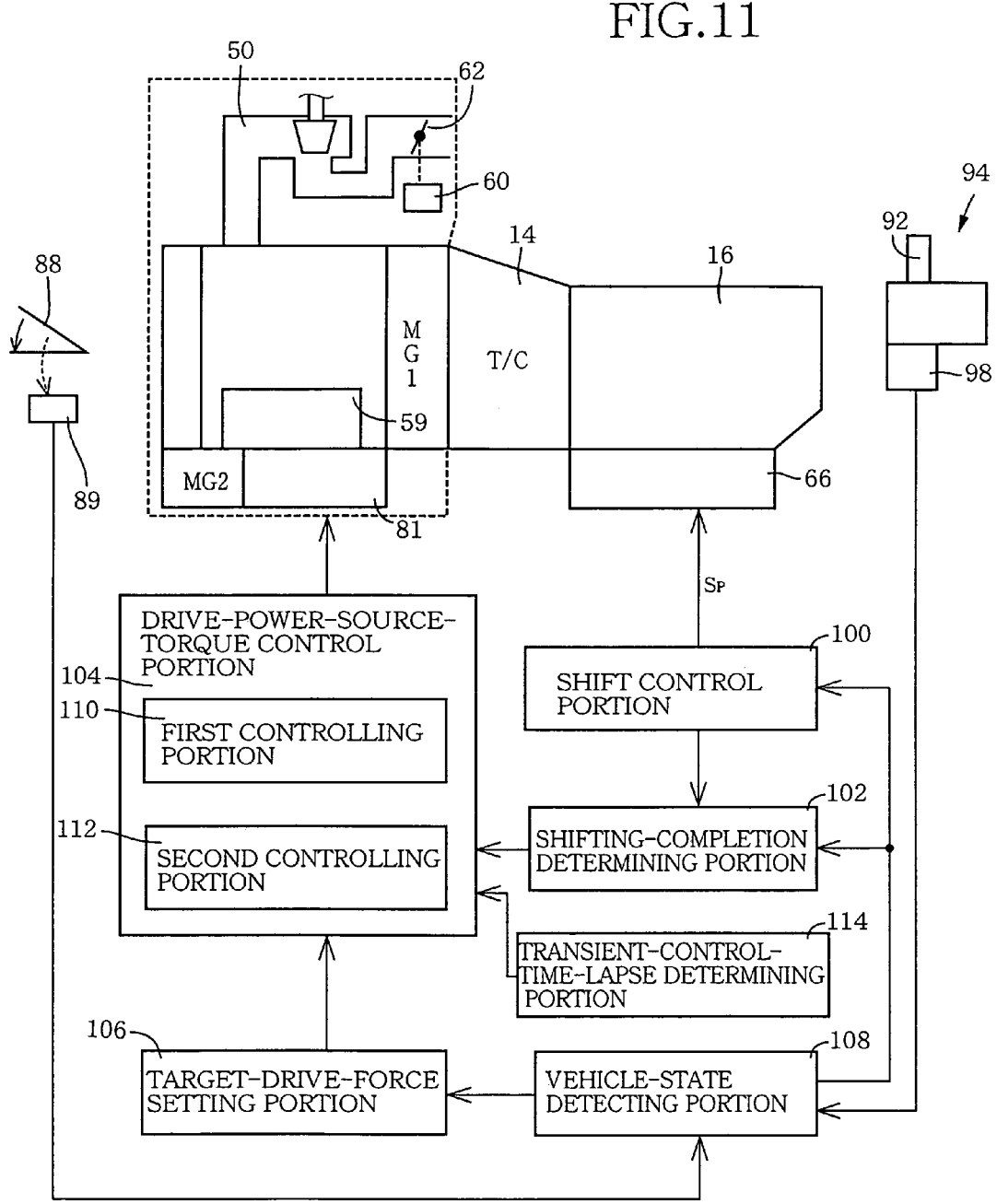
FIG. 11 is a block diagram showing major functional means of the electronic control unit of FIG. 6.

Referring next to the block diagram of FIG. 11, there are illustrated major functional means of the electronic control unit 90, which include a shift control portion 100, a shifting-completion determining portion 102, a drive-power-source-torque control portion 104, a target-drive-force setting portion 106, a vehicle-state detecting portion 108; and a transient-control-time lapse determining portion 114. The shift control portion 100 is arranged to select one of the operating positions of the automatic transmission 16, on the basis of the detected opening angle $\theta_{TH}$ of the throttle valve 62 and vehicle running speed V, and according to the shift-up and shift-down boundary lines which are represented by the stored data map and defined in a two-dimensional coordinate system, as shown in FIG. 8, as described above. The shift control portion 100 is further arranged to command the hydraulic control unit 66, for placing the hydraulically operated frictional coupling devices C, B, F in the engaged or released positions to place the automatic transmission 16 in the selected position.

A shifting action of the automatic transmission 16 to the selected position under the control of the shift control portion 100 causes a change in an output torque $T_{OUT}$ of the automatic transmission 16. Where the automatic transmission 16 is shifted down from the $4^{th}$-speed position to the $3^{rd}$-speed position, for example, this shift-down action causes an increase in the output torque $T_{OUT}$ of the automatic transmission 16 from a $4^{th}$-speed torque value $T_{OUT4}$ to a $3^{rd}$-speed torque value $T_{OUT3}$. A ratio of the $3^{rd}$-speed torque value $T_{OUT3}$ to the $4^{th}$-speed torque value $T_{OUT4}$ is equal to a ratio of a speed ratio $\gamma 3$ of the $3^{rd}$-speed position to a speed ratio $\gamma 4$ of the $4^{th}$-speed position. Namely, $T_{OUT3}=\gamma 3/\gamma 4 \cdot T_{OUT4}$. Accordingly, a vehicle drive force F which is proportional to the output torque $T_{OUT}$ of the automatic transmission 16 changes before and after the automatic transmission 16 is shifted to the newly selected position. This change of the vehicle drive force F may cause a shifting shock and deteriorate the drivability of the vehicle. The vehicle drive force F is calculated on the basis of the output torque $T_{OUT}$ of the automatic transmission 16, and related parameters such as a speed reduction ratio and power transmission loss between the output shaft 46 and the vehicle driving wheels, and a diameter of the driving wheels. In this sense, the vehicle drive force F and the output torque $T_{OUT}$ of the automatic transmission $T_{OUT}$ may be considered to be substantially equivalent to each other.

The vehicle-state detecting portion 108 is arranged to read in the output signals of the various sensors which indicate the present running state of the vehicle. For instance, the vehicle-state detecting portion 108 reads in the engine speed $N_E$ detected by the engine speed sensor 99, the turbine speed $N_T$ (speed $N_{IN}$ of the input shaft 22) detected by the turbine speed sensor 91, the vehicle running speed V (speed $N_{OUT}$ of the output shaft 46) detected by the output-shaft-speed sensor 47, the opening angle $\theta_{TH}$ of the throttle valve 62 detected by the throttle opening sensor 62, the operating amount Acc of the accelerator pedal 88 detected by the accelerator sensor 98, and the selected position $P_{SH}$ of the shift lever 92 detected by the shift-position detector 98. On the basis of those kinds of detected information, the vehicle-state detecting portion 108 determines whether the vehicle is in a running state or not. Further, the vehicle-state detecting portion 108 determines the presently selected operating position of the automatic transmission 16, on the basis of a command generated by the shift control portion 100 to shift the automatic transmission 16 according to the shift-up and shift-down boundary lines of FIG. 8.

Figure 12:
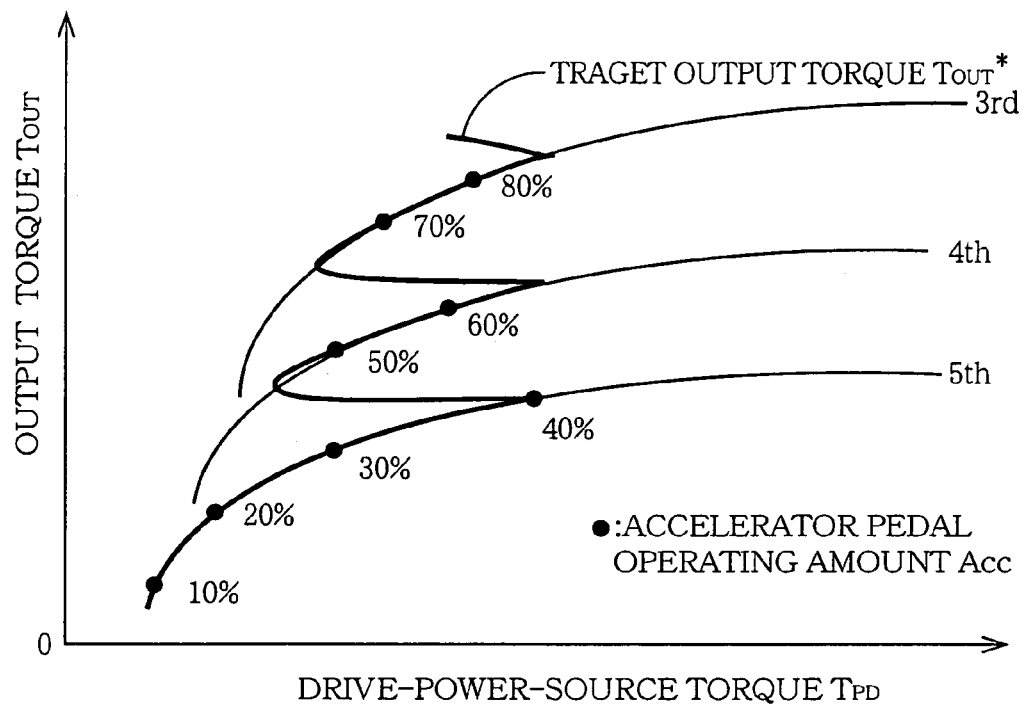
FIG. 12 is a view indicating a relationship between a drive-power-source torque in the form of the engine torque and an output torque of the automatic transmission for each of third-speed, fourth-speed and fifth-speed positions of the automatic transmission in the drive system of FIG. 1, and a relationship between the operating amount of the accelerator pedal and a target value of the output torque of the transmission.

The target-drive-force setting portion 106 is arranged to determine a target output torque $T_{OUT}^*$ of the automatic transmission 16 corresponding to a target vehicle drive force F*, on the basis of the detected operating amount Acc of the accelerator pedal 88 and the presently selected position of the automatic transmission 16. This target output torque $T_{OUT}^*$ is determined so as to permit a smooth change of (increase) of the actual output torque $T_{OUT}$ of the automatic transmission 16 with a change (increase) of the operating amount Acc of the accelerator pedal 88, irrespective of a shifting action (e.g., shift-down action) of the automatic transmission 16. FIG. 12 indicates an example of a relationship between a drive-power-source torque (as represented by the detected operating amount Acc of the accelerator pedal 88) and the output torque $T_{OUT}$ of the automatic transmission for each of the $3^{rd}$-speed, $4^{th}$-speed and $5^{th}$-speed positions of the automatic transmission 16. It will be understood from FIG. 12 that the output torque $T^{OUT}$ of the automatic transmission 16 for a given value of the drive-power-source torque increases in steps as the automatic transmission 16 is shifted down from the $5^{th}$-speed position toward the $3^{rd}$-speed position. Accordingly, there is a possibility of deterioration of the drivability of the vehicle due to a change of the output torque $T_{OUT}$ before and after a shifting action of the automatic transmission 16.

To minimize the above-indicted possibility of deterioration of the vehicle drivability, the target-drive-force setting portion 106 is arranged to determine the target output torque $T_{OUT}^*$ of the automatic transmission 16, so as to reduce an amount of change of the output torque $T_{OUT}$ of the automatic transmission 16 before and after a shift-down action, for thereby permitting a smooth increase of the output torque $T_{OUT}$ of the automatic transmission 16 with an increase of the operating amount Acc of the accelerator pedal 88 upon the shift-down action of the automatic transmission 16. That is, the target output torque $T_{OUT}^*$ is determined to permit a smooth increase of the output torque $T_{OUT}$ from a value before the shift-down action to a value after the completion of the shift-down action of the transmission 16, when the shift-down action takes place as a result of increase of the operating amount Acc of the accelerator pedal 88. Thick solid line in FIG. 12 indicates an example of a predetermined pattern of increase in the target output torque $T_{OUT}^*$ of the automatic transmission 16 when the automatic transmission 16 is shifted down from the $5^{th}$-speed position to the $4^{th}$-speed position, and from the $4^{th}$-speed position to the $3^{rd}$-speed position, as a result of an increase in the operating amount Acc of the accelerator pedal 88. This pattern of increase in the target output torque $T_{OUT}^*$ is represented by a data map stored in the ROM of the electronic control unit

90. The target-drive-force setting portion 106 determines the target output torque $T_{OUT}^*$, on the basis of the presently selected operating position of the automatic transmission 16 and the detected operating amount Acc of the accelerator pedal 88, and according to the predetermined pattern of increase of the target output torque $T_{OUT}^*$ in relation to the selected operating position of the automatic transmission 16 and the operating amount Acc (%) of the accelerator pedal 88. With the target output torque $T_{OUT}^*$ being thus determined, the actual output torque $T_{OUT}$ does not increase in steps or at a high rate, but increases smoothly or at a relatively low rate with an increase of the drive-power-source torque as represented by the operating amount Acc of the accelerator pedal 88, irrespective of the shift-down action from the $5^{th}$-speed position to the $4^{th}$-speed position or from the $4^{th}$-speed position to the $3^{rd}$-speed position. For example, the thick solid line indicates a relatively small amount of increase of the actual output torque $T_{OUT}$ corresponding to an increase of the operating amount Acc from the 40% value to the 50% value.

The shifting-completion determining portion 102 is arranged to determine whether a shifting action of the automatic transmission 100 under the control of the shift control portion 100 is terminated or completed. The determination that the shifting action is completed is made by determining whether the speed $N_{IN}$ of the input shaft 22 which follows the engine speed $N_E$ via the torque converter 14 has become substantially equal to a synchronizing input shaft speed ($\gamma \times N_{OUT}$), which is a product of the speed $N_{OUT}$ of the output shaft 46 and the speed ratio $\gamma$ of the automatic transmission 16 after completion of the shifting action. This determination by the shifting-completion determining portion 102 is used to initiate a transient drive force control by a first controlling portion 110 of the drive-power-source-torque control portion 104 which will be described.

The drive-power-source-torque control portion 104 includes the above-indicated first controlling portion 110 and a second controlling portion 112, and is arranged to control the drive power source in the form of the engine 10, motor/generator MG1 and motor/generator MG2, such that the drive power source produces a torque $T_{PD}$ which permits the actual output torque $T_{OUT}$ of the automatic transmission 16 to coincide with the target output $T_{OUT}^*$ determined by the target-drive-force setting portion 106 described above. In this respect, it is noted that the output torque $T_{OUT}$ of the automatic transmission 16 having the plurality of operating positions having the respective different speed ratios considerably changes from a value before a shifting action to a value after completion of the shifting action. Accordingly, the drive-power-source torque $T_{PD}$ must be controlled to reduce an amount of change of the output torque $T_{OUT}$ of the automatic transmission 16 before and after the shifting action. To this end, the first controlling portion 110 which has a higher operating response than the second controlling portion 112 is operated to initiate a temporary control of the drive-power-source torque $T_{PD}$, upon determination by the shifting-completion determining portion 102 that the shifting action of the automatic transmission 16 is completed. The temporary control of the drive-power-source torque $T_{PD}$ by the first controlling portion 110 is effected such that the actual output torque $T_{OUT}$ coincides with the target output torque $T_{OUT}^*$. The temporary control by the first controlling portion 110 is followed by a continuous control of the drive-power-source torque $T_{PD}$ by the second controlling portion 112, which has a lower operating response but is capable of continuously controlling the drive-power-source torque $T_{PD}$. For example, a shift-down action of the automatic transmission 16 results in a considerable increase of the output torque $T_{OUT}$, so that the drive-power-source torque $T_{PD}$ must be reduced. To this end, the temporary control by the first controlling portion 110 having a relatively high operating response is initiated to temporarily reduce the drive-power-source torque $T_{PD}$, upon determination of completion of the shifting action by the shifting-completion determining portion 102, and then the continuous control by the second controlling portion 112 is effected following the temporary control, for continuously reducing the drive-power-source torque $T_{PD}$.

The temporary control of the drive-power-source torque $T_{PD}$ by the first controlling portion 110 is effected for a predetermined transient control time $t_P$ after the moment of completion of the shifting action of the automatic transmission 16. During this control time $t_P$, the second controlling portion 112 is not highly responsive to a signal generated by the shifting-completion determining portion 102, and is not highly capable of timely controlling the drive-power-source torque $T_{PD}$, for reducing the amount of change of the output torque $T_{OUT}$ of the automatic transmission 16 without a delay. In this respect, the temporary control of the drive-power-source torque $T_{PD}$ by the first controlling portion 110 may be referred to as a "transient drive force control".

The first controlling portion 110 is suitable for effecting the temporary control of the drive-power-source torque $T_{PD}$. Namely, the first controlling portion 110 has a sufficiently high operating response but is not highly capable of effecting the continuous control of the torque $T_{PD}$, as already indicated above. For instance, this first controlling portion 110 includes at least one of an ignition-timing control device and an electric-motor-torque control device. The ignition-timing control device is arranged to effect an ignition-timing control of adjusting or changing (retarding) an ignition timing of the engine 10 by controlling the ignition device 59. The electric-motor-torque control device is arranged to effect an electric-motor-torque control of controlling an electric motor torque $T_M$ by controlling the switching devices 72, 73 to control amounts of electric current to be applied from the fuel cell 70 and the secondary battery 71 to the first motor/generator MG1 and/or the second motor/generator MG2. The electric motor torque $T_M$ is a total torque of the motor/generator MG1 and the motor/generator MG2. The drive-power-source torque $T_{PD}$ is equal to a sum of the engine torque $T_E$ and the electric motor torque $T_M$. However, the ignition-timing control by the ignition-timing control device is not suitable to control the engine torque $T_E$ before the engine 10 is sufficiently warmed up, and may not be continued for a long time since an exhaust emission from the engine 10 may be deteriorated by a long period of the ignition timing control. On the other hand, the electric-motor-torque control by the electric-motor-torque control device may not be continued for a long time under some conditions of the fuel cell 70 and the secondary battery 71. Thus, the ignition-timing control and the electric-motor-torque control by the first controlling portion 110 are suitable for temporarily controlling the drive-power-source torque $T_{PD}$ for the transient control time $t_P$, with a sufficiently high response.

The second controlling portion 112 has a lower operating response but is capable of continuously controlling the drive-power-source torque $T_{PD}$ with high stability for a relatively long time. When the output torque $T_{OUT}$ of the automatic transmission 16 abruptly changes by a relatively large amount upon a shifting action thereof, the second controlling portion 112 does not permit a timely control of the drive-power-source torque $T_{PD}$, so that the temporary or transient control of the torque $T_{PD}$ by the first controlling portion 110 is first initiated, and the temporary control is switched to the continuously control of the torque $T_{PD}$ by the second controlling portion 112 when the predetermined transient control time $t_P$ has passed. At the time of expiration of the transient control time $t_P$, the second controlling portion 112 is able to reduce the drive-power-source torque $T_{PD}$, and the amount of reduction of the torque $T_{PD}$ by the second controlling portion 112 is gradually increased. After the expiration of the transient control time tP, the amount of reduction of the torque $T_{PD}$ by the temporary control by the first controlling portion 110 is gradually reduced as the amount of reduction of the torque $T_{PD}$ is gradually increased.

For example, the second controlling portion 112 suitable for continuously controlling the drive-power-source torque $T_E$ includes at least one an electronic-throttle-valve control device, a supercharging-pressure control device and the above-described valve drive control device 81. The electronic-throttle-valve control device is arranged to effect an electronic-throttle-valve control of controlling the throttle actuator 60 to control the opening angle $\theta_{TH}$ of the electronically controlled throttle valve 62. The supercharging-pressure control device is arranged to effect a supercharging-pressure control of controlling the exhaust waste gate valve 56 to control the supercharging pressure of the supercharger 54 of exhaust turbocharger type. The valve drive control device 81 is arranged to effect an engine-cylinder control of controlling the number of the operable cylinders of the engine 10. For example, the electronic-throttle-valve control is formulated such that the opening angle $\theta_{TH}$ of the throttle valve 62 is controlled irrespective of the predetermined relationship of FIG. 7 between this opening angle $\theta_{TH}$ and the operating amount Acc of the accelerator pedal 88, so as to change the engine torque $T_E$ for thereby changing the output torque $T_{OUT}$ of the automatic transmission 16. However, the electronic-throttle-valve control device does not have a sufficiently high operating response, since the electronically controlled throttle valve 62 does not have a high operating response, and since a surge tank is provided in an intake air passage.

When the accelerator pedal 88 is depressed to gradually increase its operating amount Acc, as indicated by thick solid line in FIG. 12, the automatic transmission 16 is shifted down from the $4^{th}$-speed position to the $3^{rd}$-speed position in the process of change of the operating amount Acc from 60% to 70%, for example. In this case, the transient control of the drive-power-source torque $T_{PD}$ by the first controlling portion 110 of the drive-power-source-torque control portion 104 is effected for the predetermined transient control time $t_P$ after completion of the shift-down action, to temporarily reduce the drive-power-source torque $T_{PD}$, for reducing the output torque $T_{OUT}$ of the automatic transmission 16 such that the reduced output torque $T_{OUT}$ coincides with the target output torque TOUT* determined when the shift-down action takes place. During the transient control time $t_P$, the drive-power-source torque $T_{PD}$ can be effectively reduced without a delay, by the first controlling portion 110 having a comparatively high operating response. For example, the temporary or transient control of the drive-power-source torque $T_{PD}$ is effected by retarding the ignition timing of the engine 10 by operation of the ignition-timing control device, and/or by controlling the amount of electric current to be applied to the first motor generator MG1 and/or the second motor generator MG1.

Figure 13:
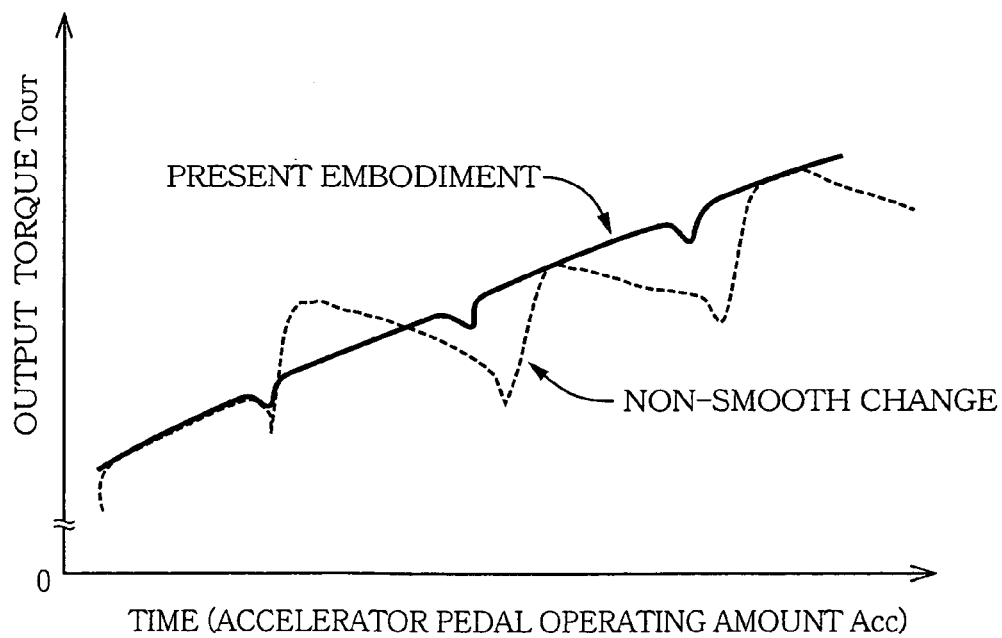
FIG. 13 is a view indicating relationships between the output torque of the automatic transmission and the operating amount of the accelerator pedal, wherein the relationship according to the present embodiment is indicated by solid line, while the relationship in the prior art is indicated by broken line.

Upon expiration of the transient control time $t_P$, the second controlling portion 112 is able to reduce the drive-power-source torque $T_{PD}$, and the amount of reduction of the torque $T_{PD}$ by the second controlling portion 112 is gradually increased. After the expiration of the transient control time tP, the amount of reduction of the torque $T_{PD}$ by the temporary control by the first controlling portion 110 is gradually reduced as the amount of reduction of the torque $T_{PD}$ by the second controlling portion 112 is gradually increased. Thus, the transient control by the first controlling portion 110 is gradually switched to the continuous control by the second controlling portion 112. For example, the drive-power-source torque $T_{PD}$ is reduced by the second controlling portion 112, by effecting at least one of (1) the electronic-throttle-valve control to reduce the opening angle $\theta_{TH}$ of the electronically controlled throttle valve 62 by reducing the intake air quantity to be introduced into the cylinders of the engine 10, (2) the supercharging-pressure control to lower the supercharging pressure of the supercharger 54, and (3) the engine-cylinder control to reduce the number of the operable cylinders of the engine 10. As a result, the output torque $T_{OUT}$ of the automatic transmission 16 is smoothly changed with a gradual increase of the operating amount Acc of the accelerator pedal 88, as indicated by solid line in FIG. 13, so that an amount of change of the vehicle drive force before and after the shifting action of the automatic transmission 16 is effectively reduced to minimize a shifting shock of the automatic transmission 16, whereby the drivability of the vehicle is improved. In FIG. 13, broken line indicates a non-smooth or abrupt change of the output torque $T_{OUT}$ of an automatic transmission of a vehicle provided with the conventional vehicle control apparatus.

The transient-control-time-lapse determining portion 114 is arranged to determine whether the predetermined transient control time $t_P$ has elapsed. As explained above, the transient control time $t_P$ is a period of time in which the second controlling portion 112 is not highly responsive to the signal generated by the shifting-completion determining portion 102, and is not highly capable of timely controlling the drive-power-source torque $T_{PD}$, for reducing the amount of change of the output torque $T_{OUT}$ of the automatic transmission 16 without a delay. In other words, the operation of the second controlling portion 112 becomes effective to reduce the amount of change of the output torque $T_{OUT}$, when the predetermined transient control time $t_P$ has passed after the moment of completion of the shifting action of the automatic transmission 16, which is detected by the shifting-completion determining portion 102. The transient control time $t_P$ is determined by a response delay time of the second controlling portion 112 which is obtained by laboratory experimentation or on the basis of data obtained during running of the vehicle.

Figure 14:
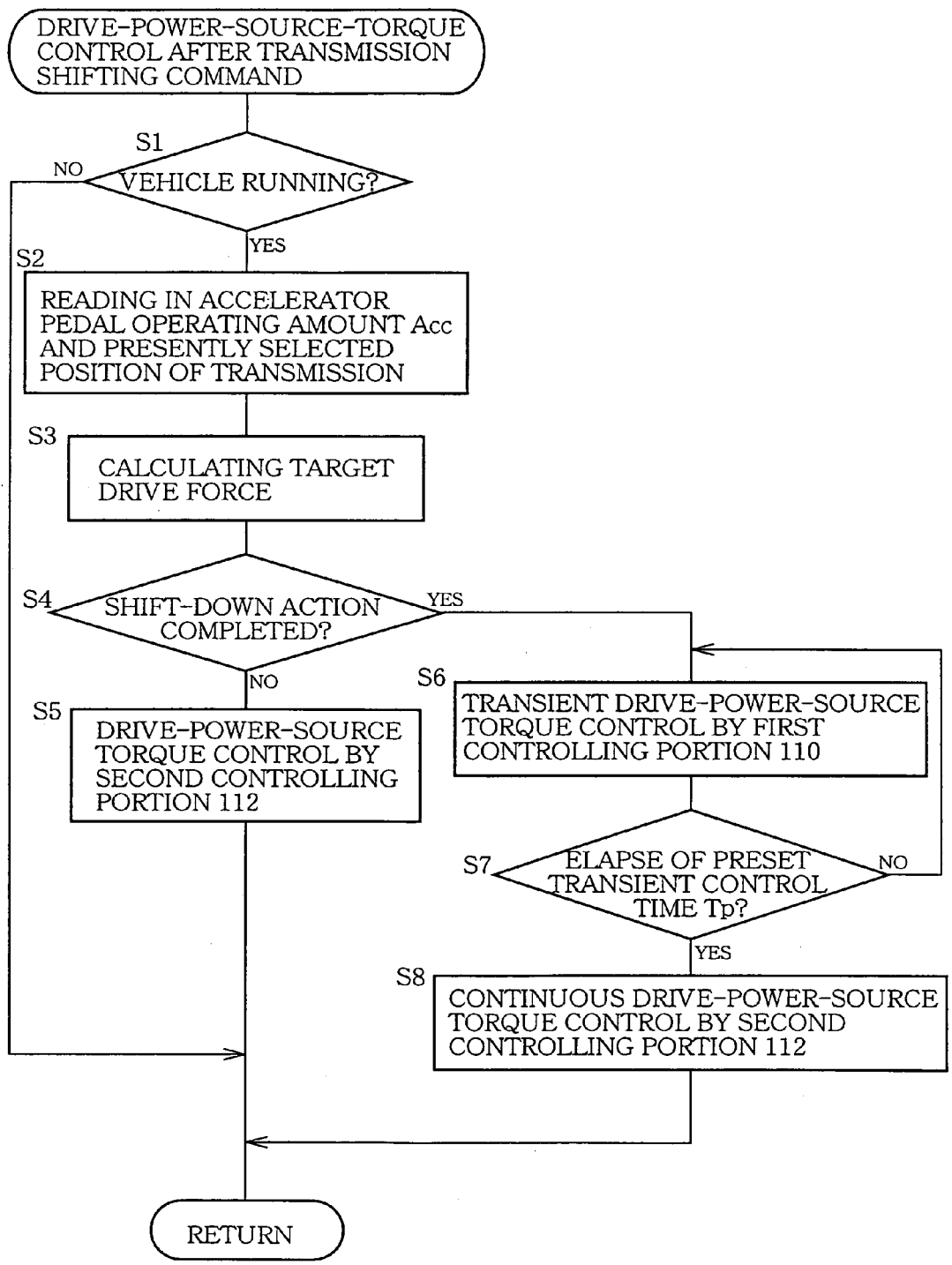
FIG. 14 is a flow chart illustrating a drive-power-source-torque control routine executed by the electronic control unit shown of FIG. 6, for controlling a drive-power-source torque, so as to permit a smooth change of the output torque of the automatic transmission with a change of the operating amount of the accelerator pedal, upon a shifting action of the transmission.

Referring to the flow chart of FIG. 14, there is illustrated a routine for controlling the drive-power-source torque $T_{PD}$, which is executed by the electronic control unit 90 to permit a smooth change of the output torque $T_{OUT}$ of the automatic transmission 16 with a continuous change of the manually operated vehicle accelerating member in the form of the operating amount Acc of the accelerator pedal 88, irrespective of a shifting action of the automatic transmission 16. The time chart of FIG. 15 indicates changes of various parameters during an operation of the electronic control unit 90 to control the drive-power-engine torque $T_{PD}$ according to the drive-power-source-torque control routine of FIG. 14. The drive-power-source-torque control routine will be described by reference to the flow chart of FIG. 14, in the case where the automatic transmission 16 is shifted down as a result of a gradual increase of the operating amount Acc of the accelerator pedal 88.

The drive-power-source-torque control routine of FIG. 14 is initiated with step S1 corresponding to the vehicle-state detecting portion 108, to determine whether the vehicle is in a running state or not. This determination in step S1 is made on the basis of information including: the engine speed $N_E$ detected by the engine speed sensor 99; the turbine speed $N_T$ (=speed $N_{IN}$ of the input shaft 22) detected by the turbine speed sensor 91; the vehicle running speed V detected by the output-shaft-speed sensor 47; the opening angle $\theta_{TH}$ of the electronically controlled throttle valve 62 detected by the throttle opening sensor 63; the operating amount of the vehicle accelerating member in the form of the accelerator pedal 88 detected by the accelerator sensor 89; and the presently selected position $P_{SH}$ of the shift lever 92. When the engine speed $N_E$ is increased as a result of depression of the accelerator pedal 88 while the shift lever 92 is placed in its neutral position N, that is, when a racing of the engine 10 occurs with the shift lever 92 placed in the neutral position, or when the vehicle is driven in the reverse direction with the shift lever 92 placed in its reverse drive position R, the engine torque $T_E$ is continuously increased with an increase of the operating amount of the accelerator pedal 88. If a negative decision (NO) is obtained in step S1, one cycle of execution of the drive-power-source-torque control routine is terminated. If an affirmative decision (YES) is obtained in step S1, the control flow goes to step S2 also corresponding to the vehicle-state detecting portion 108, to read in the operating amount Acc of the accelerator pedal 88 detected by the accelerator sensor 89, and optionally the presently selected position of the automatic transmission 16 which is determined by the shift control portion 100 according to the data map representative of the shift-up and shift-down boundary lines of FIG. 8.

Step S2 is followed by step S3 corresponding to the target-drive-force setting portion 106, to determine the target output torque $T_{OUT}^*$ of the automatic transmission 16 on the basis of the detected operating amount Acc of the accelerator pedal 88 and the presently selected position of the automatic transmission 16, so that the actual output torque $T_{OUT}$ of the automatic transmission 16 is smoothly changed with a change of the operating amount Acc. For instance, the target output torque $T_{OUT}^*$ is determined so that an amount of change of the output torque $T_{OUT}$ after a shifting action of the automatic transmission 16 is smaller than that before the shifting action, whereby the output torque $T_{OUT}$ is smoothly changed with a change of the operating amount Acc of the accelerator pedal 88. Thick solid line in FIG. 12 indicates an increase of the target output torque $T_{OUT}^*$ with an increase of the operating amount Acc of the accelerator pedal 88 during which the two shift-down actions of the automatic transmission 16 take place.

Step S3 is followed by step S4 corresponding to the shifting-completion determining portion 102, to determine whether a shifting action of the automatic transmission 16 initiated (at a point of time t1 indicated in FIG. 15) under the control of the shift control portion 100 is completed or not. This determination in step S4 is made, for example, by determining whether the input shaft speed $N_{IN}$ has become substantially equal to the synchronizing input shaft speed ($\gamma \times N_{OUT}$), which is a product of the output shaft speed $N_{OUT}$ and the speed ratio $\gamma$ of the position of the automatic transmission 16 established after the shifting action. The principle of the present invention is applicable to shifting actions of the automatic transmission 16 according to the shift-up and shift-down boundary lines of FIG. 8 under the control of the shift control portion 100. If a negative decision (NO) is obtained in step S5, the control flow goes to step S5 corresponding to the second controlling portion 112, in which the drive-power-source torque $T_{PD}$ is controlled to maintain the present value of the output torque $T_{OUT}$ of the automatic transmission 16. As described above, the continuous control of the drive-power-source torque $T_{PD}$ by the second controlling portion 112 is effected by at least one of the electronic-throttle-valve control of controlling the opening angle $\theta_{TH}$ of the electronically operated throttle valve 62, the supercharging-pressure control of controlling the exhaust waste gate valve 56 to control the supercharging pressure Pa of the supercharger 54 of exhaust turbocharger type, and the engine-cylinder control of controlling the valve drive control device 81 to control the number of the operable cylinders of the engine 10.

Figure 15:
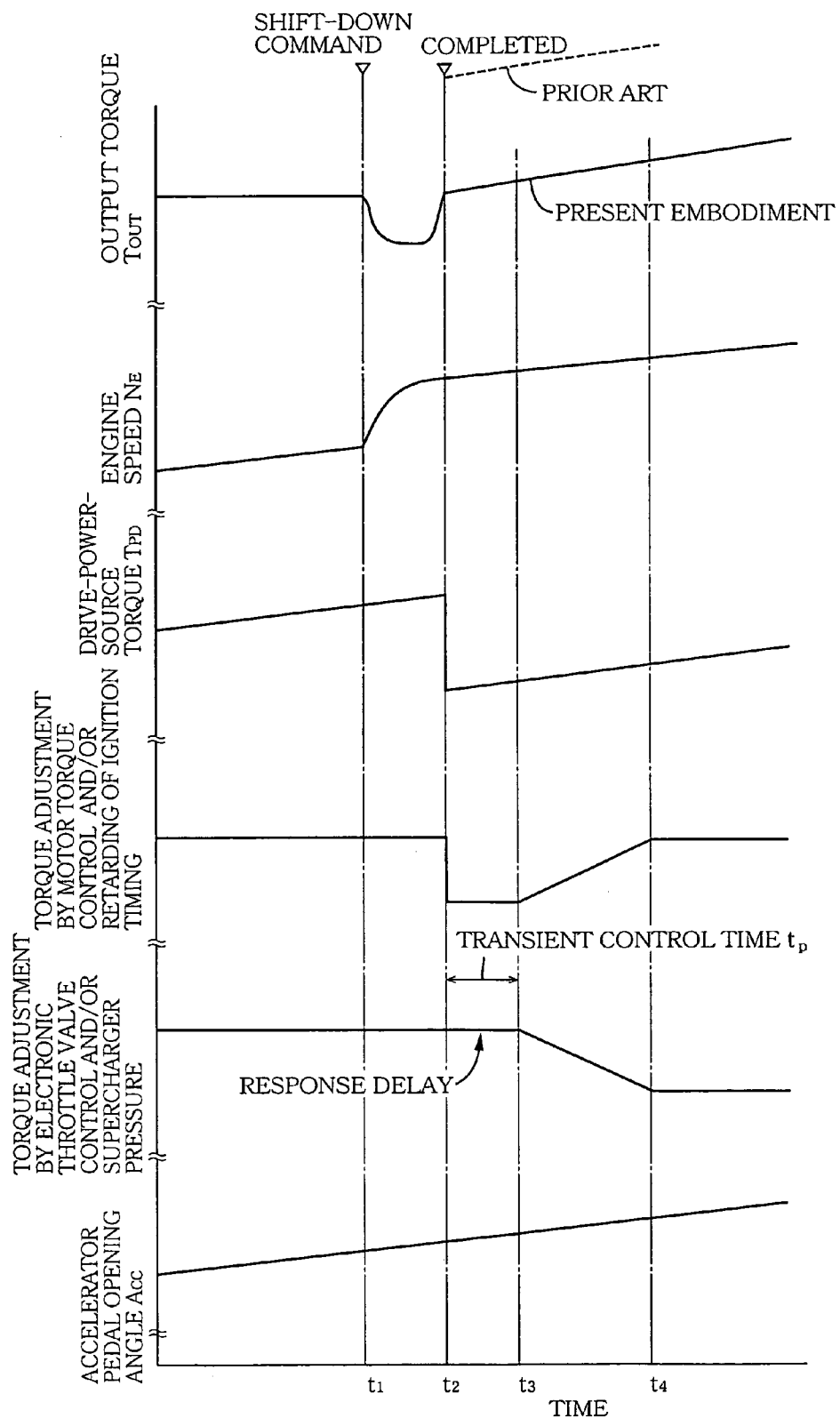
FIG. 15 is a time chart indicating changes of various parameters during an operation of the electronic control unit to control the drive-power-engine torque according to the drive-power-source-torque control routine of FIG. 14.

If an affirmative decision (YES) is obtained in step S4, the control flow goes to step S6 corresponding to the first controlling portion 110, to initiate the transient or temporary control of the drive-power-source torque $T_{PD}$, at a point of time t2 indicated in FIG. 15. Namely, the temporary or transient control of the drive-power-source torque $T_{PD}$ in step S4 by the first controlling portion 110 is effected, to obtain the target output torque $T_{OUT}^*$ determined upon completion of the shift-down action of the automatic transmission 16 initiated during a gradual increase of the operating amount Acc of the accelerator pedal 88 as indicated by the thick solid line in FIG. 12, for the predetermined transient control time $t_P$ during which the operation of the second controlling portion 112 is not effective to reduce the drive-power-source torque $T_{PD}$ which would abruptly increase as a result of the shift-down action of the automatic transmission 16. As described above, the first controlling portion 110 having a higher operating response than the second controlling portion 112 in the capability to reduce the drive-power-source-torque $T_{PD}$ employs at least one of the ignition-timing control device arranged to effect the ignition-timing control of retarding the ignition timing of the engine 10 by controlling the ignition device 59, and the electric-motor-torque control device arranged to effect the electric-motor-torque control of controlling the torque $T_M$ of the electric motor (motor/generator MG1 and/or motor/generator MG2) by controlling the switching devices 72, 73 to control amounts of electric current to be applied from the fuel cell 70 and the secondary battery 71 to the first motor/generator MG1 and/or the second motor/generator MG2.

Where the automatic transmission 16 is shifted down from the 4$^{rd}$-speed position to the 3$^{rd}$-speed position, for example, this shift-down action causes an increase in the output torque $T_{OUT}$ of the automatic transmission 16 from the 4$^{th}$-speed torque value $T_{OUT4}$ to the 3$^{rd}$-speed torque value $T_{OUT3}$. The ratio of the 3$^{rd}$-speed torque value $T_{OUT3}$ to the 4$^{th}$-speed torque value $T_{OUT4}$ is equal to the ratio of the speed ratio $\gamma 3$ of the 3$^{rd}$-speed position to the speed ratio $\gamma 4$ of the 4$^{th}$-speed position. Namely, $T_{OUT3} = \gamma 3/\gamma 4 \cdot T_{OUT4}$. To reduce the difference between the 3$^{rd}$-speed torque value $T_{OUT3}$ and the 4$^{th}$-speed torque value $T_{OUT4}$ (the amount of change from the 4$^{th}$-speed torque value $T_{OUT4}$ to the 3$^{rd}$-speed torque value $T_{OUT3}$), the drive-power-source torque $T_{PD3}$ after the shift-down action is reduced by an amount corresponding to the ratio of the speed ratio $\gamma 4$ of the 4$^{th}$-speed position to the speed ratio $\gamma 3$ of the 3$^{rd}$-speed position. Namely, $T_{PD3} = \gamma 4/\gamma 3 \cdot T_{PD4}$. Thus, the drive power source is controlled by the first controlling portion 110 to reduce the drive-power-source torque $T_{PD}$ to $T_{PD3}$.

Step S6 is followed by step S7 corresponding to the transient-control-time-lapse determining portion 114, to determine whether the predetermined transient control time $t_P$ has elapsed. Step S6 is repeatedly implemented until an affirmative decision (YES) is obtained in step S7. If the affirmative decision is obtained in step S7 (at a point of time t3 indicated in FIG. 15), the control flow goes to step S8 also corresponding to the second controlling portion 112, in which the amount of reduction of the torque $T_{PD}$ by the second controlling portion 112 is gradually increased while the amount of reduction of the torque $T_{PD}$ by the first controlling portion 110 is gradually reduced, so that the transient control by the first controlling portion 110 is gradually switched to the continuous control by the second controlling portion 112. The transient control time $t_P$ may be replaced by a time period including a period (between points of time t2 and t4 indicated in FIG. 15) in which the amount of reduction of the torque $T_{PD}$ by the second controlling portion 112 is increased as the amount of reduction of the torque $T_{PD}$ is reduced. As a result of the transient and continuous controls of the drive-power-source torque $T_{PD}$ by the first and second controlling portions 110, 112, the drive-power-source torque $T_{PD}$ (e.g., engine torque $T_E$) after the shift-down action of the automatic transmission 16 is made smaller than that before the shift-down action, as indicated in FIG. 15, so that the output torque $T_{OUT}$ (indicated by solid line in FIG. 15) of the automatic transmission 16 after the shifting action is reduced with respect to that (indicated by broken line in FIG. 15) controlled by the prior art vehicle control apparatus. As indicated in FIG. 15, the output torque $T_{OUT}$ is reduced in the process of the shift-down action, due to partially engaging states of the two frictional coupling devices which are eventually engaged and released, respectively, such that these engaging and releasing action take place substantially concurrently.

The drive-power-source-torque control portion 104 is thus arranged to permit a smooth or gradual change of the drive-power-source torque $T_{PD}$ with a gradual change of the operating amount Acc of the accelerator pedal 88, for thereby permitting a smooth increase of the output torque $T_{OUT}$ of the automatic transmission 16, as indicated by thick solid lines in FIGS. 12 and 13, irrespective of the shift-down action of the automatic transmission 16, so that the vehicle drive force F will not abruptly increase but smooth increase after the shift-down action, whereby the vehicle can be driven with a high degree of drivability, without a considerable shifting shock of the automatic transmission 16 due to an abrupt increase of the vehicle drive force F after the shifting action.

In the vehicle control apparatus constructed according to the present embodiment and operated as described above, the target-drive-force setting portion 106 (step S3) determines the target drive force F* in the form of the target output torque $T_{OUT}$* of the automatic transmission 16 on the basis of the detected operating amount Acc of the manually operable vehicle accelerating member in the form of the accelerator pedal 88 and the presently selected position of the automatic transmission 16, such that the determined target drive force F* permits a smooth change of the actual vehicle drive force F (actual output torque $T_{OUT}$ of the automatic transmission 16) with an increase of the operating amount Acc, irrespective of the shifting action of the automatic transmission 16. Further, the first controlling portion 110 (step S6) of the drive-power-source-torque control portion 104 effects the temporary or transient control of the drive-power-source torque $T_{PD}$, using at least one drive-power-source-torque control device (such as the ignition-timing control device and electric-motor-torque control device) which has a comparatively high operating response, and the second controlling portion 112 (steps S5 and S8) effects the continuous control of the drive-power-source torque $T_{PD}$ following the transient control by the first controlling portion 110, by using at least one drive-power-source-torque control device (such as electronic-throttle-valve control device, supercharging-pressure control device and valve-drive control device) which is capable of continuously controlling the torque $T_{PD}$ for a relatively long time. In this arrangement, the output torque $T_{OUT}$ of the automatic transmission 16 is smoothly changed with a change of the operating amount Acc of the accelerator pedal 88, without an abrupt change of the torque $T_{OUT}$ upon a shifting action of the automatic transmission 16, so that an abrupt change of the vehicle drive force F after the shifting action is prevented to improve the drivability of the vehicle. It is also appreciated that the above-indicated drive-power-source-torque control devices used as the first and second controlling portions 110, 112 of the drive-power-source-torque control portion 104 are available on the vehicle and need not be provided as control devices exclusively designed for the purpose of controlling the drive-power-source torque $T_{PD}$ so as to permit a smooth change of the vehicle drive force F upon a shifting action of the automatic transmission 16.

While the drive power source in the present embodiment consists of the engine 10 and the two electric motors (MG1 and MG2), the drive-power-source torque $T_{PD}$ can be controlled by the first controlling portion 110 (step S6) by controlling at least one of the engine torque $T_E$ and the electric motor torque $T_M$ (at least one of the torque of the MG1 and the torque MG2), namely, by using at least one of the ignition-timing control device arranged to control the ignition timing of the engine 10 to control the engine torque $T_E$, and the electric-motor-torque control device arranged to control the electric motor torque $T_M$. Accordingly, the drive-power-source torque $T_{PD}$ can be controlled with a high response to the output signal of the shifting-completion determining portion 102.

Further, the second controlling portion 112 (steps S5 and S8) may be provided by at least one of the electric-throttle-valve control device arranged to control the opening angle $\theta_{TH}$ of the electronically controlled throttle valve 62, the supercharging-pressure control device arranged to control the supercharging pressure of the supercharger 54, and the valve-device control device arranged to control the number of the operable cylinders of the engine 10. These devices are capable of continuously controlling the drive-power-source torque $T_{PD}$ for a relatively long time.

While the preferred embodiment of this invention has been described in detail by reference to the accompanying drawings, it is to be understood that the invention may be otherwise embodied.

In the illustrated embodiment, the drive-power-source torque $T_{PD}$ is controlled so as to permit a smooth increase of the output torque $T_{OUT}$ of the automatic transmission 16 (vehicle drive force F), when the automatic transmission 16 is shifted down from the $4^{th}$-speed position to the $3^{rd}$-speed position as a result of a gradual increase of the operating amount Acc of the accelerator pedal 88. However, the principle of this invention is equally applicable to shift-down actions of the automatic transmission 16 from the $5^{th}$-speed position to the $4^{th}$-speed position, from the $3^{rd}$-speed position to the $2^{nd}$-speed position, and from the $2_{nd}$-speed position to the $1^{st}$-speed position. The principle of this invention is further applicable to shift-up actions of the automatic transmission 16, which take place as a result of a gradual decrease of the operating amount Acc of the accelerator pedal 88. The target output torque values $T_{OUT}^*$ of the automatic transmission 16 indicated by the thick solid lines in FIG. 12 can be used for controlling the drive-power-source torque $T_{PD}$ upon a shift-up action of the transmission 16. In this case, the output torque $T_{OUT}$ after the shift-up action is reduced with respect to that before the shift-up action, so that the drive-power-source torque $T_{PD}$ must be increased by the drive-power-source-torque control portion 104, so as to permit a smooth decrease of the output torque $T_{OUT}$.

In the illustrated embodiment, the temporary or transient control of the drive-power-source torque TPD by the first controlling portion 110 (step S6) is initiated when the shifting-completion determining portion 102 (steps S4) has determined that a shifting action of the automatic transmission 16 is completed. However, the transient control by the first controlling portion 110 may be initiated before completion of the shifting action, for instance, a predetermined time before completion of the shifting action, for example, when a difference between the input-shaft speed $N_{IN}$ and the synchronizing input-shaft speed ($\gamma \times N_{OUT}$) has been reduced to about 50 r.p.m.

While the fluid-operated power transmitting device in the form of the torque converter 14 is provided with the lock-up clutch 26, the fluid-operated power transmitting device need not be provided with the lock-up clutch 26. Further, the fluid-operated power transmitting device need not have a torque boosting function.

In the illustrated embodiment, the drive power source consists of the internal combustion engine 10, and the first motor/generator MG1 and the second motor/generator MG2 which are operatively connected to the engine 10. However, the drive power source consists of at least one of the engine 10, MG1 and MG2. The internal combustion engine 10 may be a gasoline engine or a diesel engine. Further, the engine 10 need not be provided with the supercharger of exhaust turbocharger type disposed so as to bridge the intake and exhaust pipes 50, 52. The motor/generator MG1 and motor/generator MG2 may be directly connected to the engine 10, or indirectly connected to the engine through a belt or any other connecting means. Where the drive power source consists of only the motor/generator MG1 and/or the motor/generator MG2, only the electric-motor-torque control device is available as the first controlling portion 110 for controlling the drive-power-source torque $T_{PD}$.

The engine 10 in the illustrated embodiment is provided with the variable valve mechanism 78 including electromagnetically operated valves in the form of the intake and exhaust valves 74, 75 that are opened and closed by the respective electromagnetic actuators 76, 77. However, only one of the intake and exhaust valves 74, 75 may be electromagnetically operated. Further, the engine 10 need not be provided with the variable valve mechanism 78. The intake and exhaust valves 74, 75 may be operated by electric actuators such as electric motors, or by a valve drive mechanism which is arranged to open and close the intake and exhaust valves in synchronization with the rotary motion of the crankshaft of the engine 10 and which is equipped with a valve timing mechanism arranged to adjust the opening and closing timings of the intake and exhaust valves. The valve drive mechanism may be of an OHV type, an OHC type or a DOHC type. In the valve drive mechanism of the DOHC type, the rotary motion of the crankshaft of the engine is transmitted to the intake valve or exhaust valve through a pulley on the crankshaft, a timing belt, a pulley on a cam shaft, the cam shaft, and a rocker arm or valve lifter connected to the intake or exhaust valve. In this type of engine, the valve timing device may be provided on the rocker arm or cam shaft pulley, or on at least one of the two cam shafts for the respective intake and exhaust valves, such that the synchronization timing of the two cam shafts is variable. Alternatively, the characteristic (profile) of the cam shafts is changed or switched to change the lift, opening angle or opening and closing timings of the valves, so that the engine speed and torque can be adjusted as needed.

Although the automatic transmission 16 incorporates the three planetary gear sets 40, 42, 44 and has the five forward drive positions, the vehicle drive system may use an automatic transmission of any other types which is shiftable by engaging and releasing hydraulically operated frictional coupling devices such as clutches and brakes. For example, the automatic transmission 16 may be modified to incorporate two, four or more planetary gear sets or to have four forward drive positions, or six or more forward drive positions. Further, the vehicle drive system may use an automatic transmission which is obtained by providing a well known manual transmission of permanent meshing parallel two axes type with selecting and shifting cylinders for automatic shifting of the transmission.

While the clutches C and brakes B used for the automatic transmission 16 in the illustrated embodiment are hydraulically operated frictional coupling devices, the automatic transmission may use electromagnetically operated frictional coupling devices such as electromagnetic clutches and magnetic powder type clutches.

It is to be understood that the present invention may be embodied with various other changes, modifications and improvements, which may occur to those skilled in the art, without departing from the spirit and scope of the invention defined in the following claims.

What is claimed is:

1. An apparatus for controlling an automotive vehicle having a drive power source, a transmission having a plurality of operating positions that are selectively established, and a manually operable vehicle accelerating member, comprising:

a target-drive-force setting portion operable to determine a target vehicle drive force on the basis of an operating amount of the manually operable vehicle accelerating member and a presently selected one of said plurality of operating positions of the transmission, such that the determined target vehicle drive force permits a smooth change of an actual vehicle drive force with a change of the operating amount of said vehicle accelerating member, irrespective of a shifting action of the transmission;

a first controlling portion having a relatively high operating response and operable to effect a transient control of a torque of the drive power source after completion of said shifting action of the transmission, so that the actual vehicle drive force coincides with said target vehicle drive force after the completion of the shifting action of the transmission; and a second controlling portion having a lower operating response than said first controlling portion but is capable of continuously controlling the torque of the drive power source, said second controlling portion being operable to effect a continuous control of the torque of the drive power source following said transient control by said first controlling portion, so that the actual vehicle drive force coincides with said target vehicle drive force after the shifting action of the transmission.

2. The apparatus according to claim 1, wherein said drive power source device includes at least one of an engine and an electric motor, and said first controlling portion includes at least one of an ignition-timing control device operable to effect an ignition-timing control of adjusting an ignition timing of the engine, and an electric-motor-torque control device operable to effect an electric motor torque control of controlling a torque of the electric motor.

3. The apparatus according to claim 1, wherein said second controlling portion includes at least one of an electronic-throttle-valve control device operable to effect an electronic throttle valve control of controlling an opening-angle of an electronically controlled throttle valve of the engine, a supercharging-pressure control device operable to effect a supercharging pressure control of controlling a supercharging pressure of a supercharger of the engine, and a valve drive control device operable to effect an engine cylinder control of controlling the number of operable cylinders of the engine.

4. The apparatus according to claim 1, further comprising a memory storing a data map representative of a predetermined relationship among the target vehicle drive force, the operating amount of the manually operable vehicle accelerating member and said plurality of operating positions of the transmission, and wherein said target-drive-force setting portion determines said target vehicle drive force on the basis of the operating amount of the manually operable vehicle accelerating member and the presently selected position of the transmission, and according to said predetermined relationship.

5. The apparatus according to claim 1, wherein the target vehicle drive force setting portion determines a target output torque of the transmission so as to reduce an amount of change of the output torque of the transmission before and after the shifting action of the transmission.

6. The apparatus according to claim 1, wherein said shifting action of the transmission is a shift-down action, and said first controlling portion effects said transient control to temporarily reduce the torque of said drive power source for a period of time after a moment of completion of said shift-down action of said transmission, during which an operation of said second controlling portion is not effective to reduce the torque of the drive power source, said transient control of the torque of the drive power source by said first controlling portion is switched to said continuous control by said second controlling portion, after said period of time, such that an amount of reduction of the torque of the drive power source by said first controlling portion is continuously reduced as the torque of the drive power source is continuously reduced by the second controlling portion.

7. The apparatus according to claim 1, further comprising a shifting-completion determining portion operable to determine whether the shifting action of the transmission is completed, and a transient-control-time-lapse determining portion operable to determine whether a predetermined transient control time has passed after a moment of determination by said shifting-completion determining portion that the shifting action is completed, said transient control of the torque of the drive power source by said first controlling portion is effected for the predetermined transient time, and is switched to said continuous control by said second controlling portion at a moment of determination by said transient-control-time-lapse determining portion that the predetermined transient control time has passed.

8. The apparatus according to claim 7, wherein the shifting action of the transmission is a shift-down action, and wherein the transient control of the torque of the drive power source by the first controlling portion is gradually switched to the continuous control by the second controlling portion such that an amount of reduction of the torque of the drive power source by the first controlling portion in a direction that permits said smooth change of the actual vehicle drive force is gradually reduced while an amount of reduction of the torque of the drive power source by the second controlling portion in said direction is gradually increased.

9. The apparatus according to claim 1, further comprising
a shifting-completion determining portion operable to determine whether the shifting action of the transmission is completed; and
a transient-control-time-lapse determining portion operable to determine whether a predetermined transient control time has passed after a determination that the shifting action is completed.

10. The apparatus according to claim 9, wherein after expiration of the transient control time, an amount of reduction of the drive power source by the first controlling portion is gradually reduced as an amount of reduction of the drive power source by the second controlling portion is gradually increased.

* * * * *